United States Patent
Monserrat et al.

(10) Patent No.: US 12,210,409 B2
(45) Date of Patent: Jan. 28, 2025

(54) DETERMINISTIC HARDWARE INDICTMENT IN RESPONSE TO FATAL PCIe NTB ERROR

(71) Applicant: Dell Products, L.P., Hopkinton, MA (US)

(72) Inventors: Ro Monserrat, Medfield, MA (US); Jonathan Krasner, Coventry, RI (US); Jerome Cartmell, Millis, MA (US)

(73) Assignee: Dell Products, L.P., Hopkinton, MA (US)

( * ) Notice: Subject to any disclaimer, the term of this patent is extended or adjusted under 35 U.S.C. 154(b) by 227 days.

(21) Appl. No.: 18/152,819

(22) Filed: Jan. 11, 2023

(65) Prior Publication Data

US 2024/0231996 A1    Jul. 11, 2024

(51) Int. Cl.
   *G06F 11/00* (2006.01)
   *G06F 11/07* (2006.01)

(52) U.S. Cl.
   CPC ...... *G06F 11/0793* (2013.01); *G06F 11/0745* (2013.01); *G06F 11/0769* (2013.01)

(58) Field of Classification Search
   CPC ............ G06F 11/0793; G06F 11/0745; G06F 11/0769
   USPC ..................................................... 714/1–57
   See application file for complete search history.

(56) References Cited

U.S. PATENT DOCUMENTS

| | | | |
|---|---|---|---|
| 9,104,543 B1* | 8/2015 | Cavanagh | H04L 41/0677 |
| 2013/0311838 A1* | 11/2013 | Shimizu | G06F 11/08 |
| | | | 714/49 |
| 2015/0113314 A1* | 4/2015 | Bulkowski | G06F 11/203 |
| | | | 714/4.11 |
| 2016/0321155 A1* | 11/2016 | Hirano | G06F 11/0766 |
| 2019/0318098 A1* | 10/2019 | Clift | G06F 11/3692 |
| 2020/0134421 A1* | 4/2020 | Suthar | G06F 11/302 |
| 2023/0176769 A1* | 6/2023 | Shalom | G06F 3/0673 |
| 2023/0185656 A1* | 6/2023 | Srivastava | G06F 11/0772 |
| | | | 714/15 |

* cited by examiner

*Primary Examiner* — Sarai E Butler
(74) *Attorney, Agent, or Firm* — Anderson Gorecki LLP

(57) ABSTRACT

A deterministic hardware indictment process is used to indict one Compute Node (CN) of a pair of CNs in response to occurrence of a fatal error on a Peripheral Component Interconnect Express (PCIe) Non-Transparent Bridge (NTB) interconnecting the two CN. Status information is exchanged between the CNs on a communication medium that is separate from the NTB. The indictment process is run locally on each CN based on whatever information is available to the CN. When the CN does not receive status information from the other CN, the CN runs a self-indictment check. When status information is received, and only one CN reports an error, the indictment process indicts the compute node that reported the error. If both CNs report errors, an error severity comparison process is used to select a CN to be indicted. If the reported errors are equally severe, a default CN is indicted.

20 Claims, 14 Drawing Sheets

Check to determine if this compute node has received a LERDS from other compute node

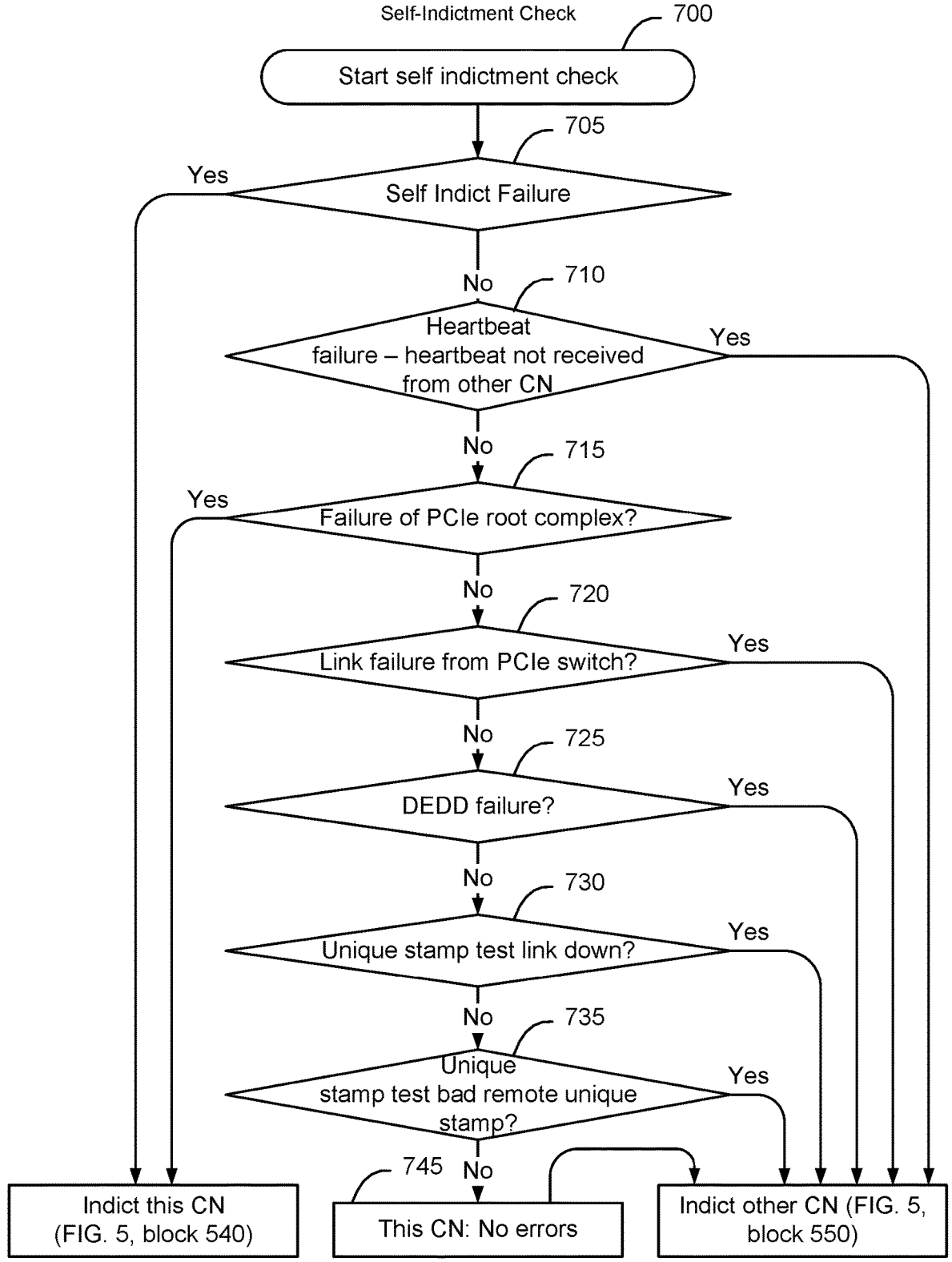

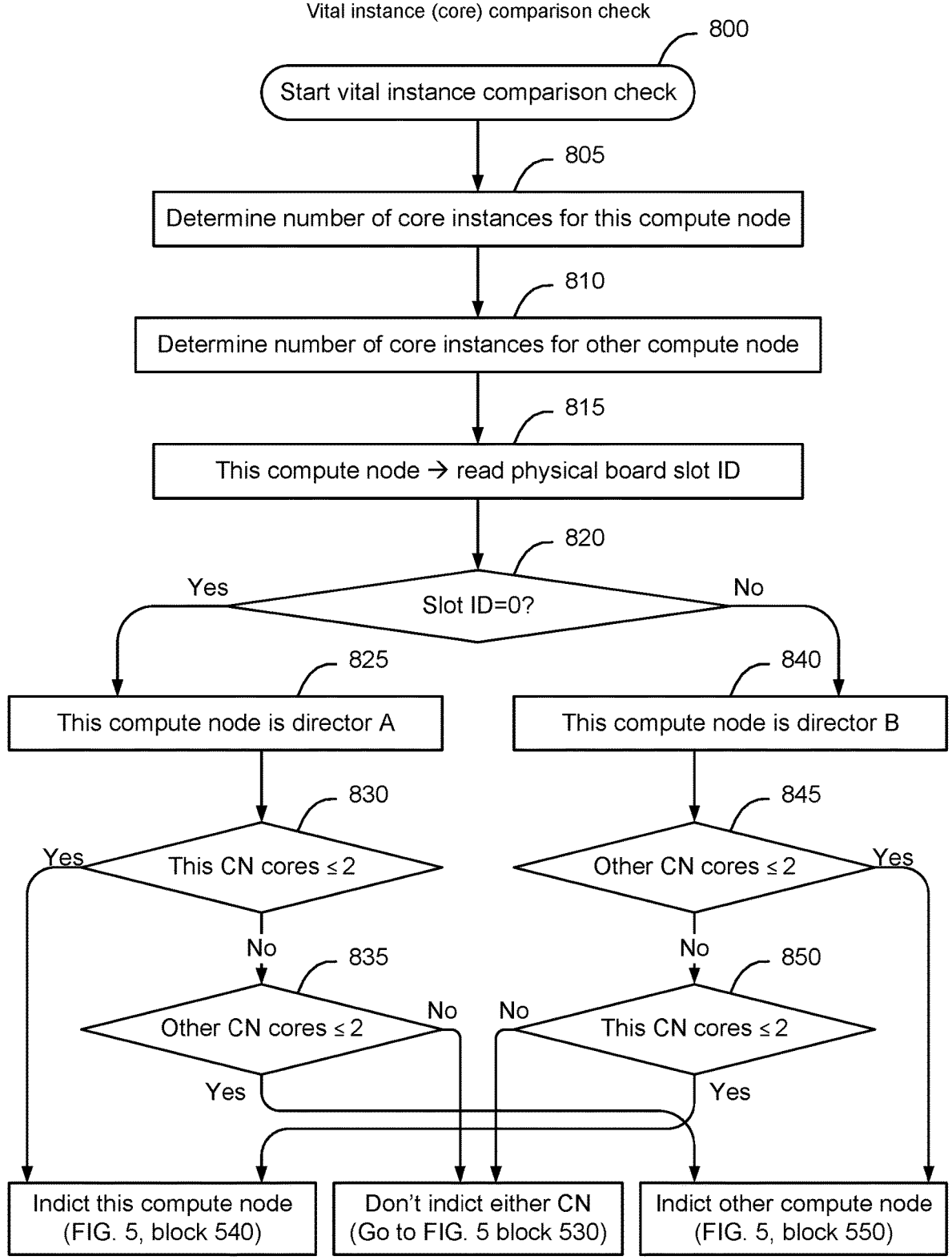

Both directors have equivalent errors - Indict default director A

DETERMINISTIC HARDWARE INDICTMENT IN RESPONSE TO FATAL PCIe NTB ERROR

FIELD

This disclosure relates to computing systems and related devices and methods, and, more particularly, to a deterministic hardware indictment process in response to occurrence of a fatal error on a Peripheral Component Interconnect Express (PCIe) Non-Transparent Bridge (NTB) interconnecting two compute nodes of a storage engine.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, in response to occurrence of a fatal error on a Peripheral Component Interconnect Express (PCIe) Non-Transparent Bridge (NTB) interconnecting two compute nodes of a storage engine, each compute node implements a deterministic hardware indictment process. Each node generates a Local Error Reporting Data Structure (LERDS) containing information about the state of hardware and software components on the compute node, and transmits the LERDS to the other compute node using a transmission medium separate from the NTB. The deterministic hardware indictment process is run locally on each compute node based on whatever information is available to the compute node. In some embodiments, if the compute node does not receive a LERDS from the other compute node, the compute node runs a self-indictment check and, if the compute node determines that it is healthy, indicts the other compute node. In some embodiments, if the compute node receives a LERDS from the other compute node, the compute node determines if there are reported errors from only one compute node or both compute nodes. In response to a determination that only one compute node has reported errors, the compute node reporting the errors is indicted. In response to a determination that both compute nodes have reported errors, an error comparison process is used to indict one of the compute nodes that has exhibited the most severe error. In response to a determination that both compute nodes have reported errors with equal severity, the deterministic indictment process indicts a default compute node.

In some embodiments, a method of implementing a deterministic hardware indictment process in response to occurrence of a fatal error on a Peripheral Component Interconnect Express (PCIe) Non-Transparent Bridge (NTB) interconnecting two compute nodes of a storage engine, includes, by each compute node identifying occurrence of the fatal error on the PCIe NTB, generating a first Local Error Reporting Data Structure (LERDS) containing information about a state of hardware and software components on this compute node, transmitting the first LERDS generated on this compute node to the other compute node using a transmission medium separate from the NTB, and determining if a second LERDS has been received from the other compute node. In response to a determination that the second LERDS has not been received from the other compute node, using the first LERDS that this compute node generated to perform a self-indictment check and indicting either this compute node or the other compute node based on the result of the self-indictment check. In response a determination that the second LERDS has been received from the other compute node, comparing the first LERDS with the second LERDS to determine whether only one of the compute nodes has reported an error or if both compute nodes have reported an error. In response to a determination that only one of the compute node has reported an error, indicting the compute node that reported the error. In response to a determination that both compute nodes have reported errors, comparing the first LERDS with the second LERDS to perform an error comparison process, determining, from the error comparison process, whether one of the compute nodes has reported a more sever error. In response to a determination that one of the compute nodes has reported a more severe error, indicting the one of the compute nodes. In response to a determination that both compute nodes have reported errors with equal severity, indicting a default compute node.

In some embodiments, the method further includes, in response to identifying occurrence of the fatal error on the PCIe NTB, shutting down the NTB by one compute node or by both compute nodes to prevent further transactions from occurring on the NTB.

In some embodiments, transmitting the first LERDS generated on this compute node to the other compute node, includes generating a User Datagram Protocol (UDP) datagram and transmitting the UDP datagram containing the first LERDS to the other compute node.

In some embodiments, the first LERDS contains information identifying any local errors, information identifying any hardware components have been faulted, and information identifying any fatal software errors, timeouts, and system state or performance statistics.

In some embodiments, determining if the second LERDS has been received from the other compute node includes writing a discernable pattern to a data structure, waiting a predetermined period of time, while waiting the predetermined time, writing a payload of any message received from the other compute node on the transmission medium separate from the NTB, and upon expiration of the predetermined period of time, reading the data structure and comparing the content of the data structure with the discernable pattern. In response to a determination that the data structure contains the discernable pattern, determining that the second LERDS has not been received. In response to a determination that at least a portion of the data structure does not contain the discernable pattern, determining that the second LERDS has been received and reading the second LERDS from the data structure.

In some embodiments, the self-indictment check includes performing a self-indict error check, and indicting this compute node in response to a determination that this compute node contains any self-indict error messages, performing a heartbeat check, and indicting the other compute node in response to a determination that the heartbeat check indicates a heartbeat failure, performing a PCIe root complex check, and indicting this compute node in response to a determination that an error has been identified in the PCIe root complex on this compute node, performing a PCIe link failure check, and indicting the other compute node in response to a determination that the PCIe link failure check identifies a PCIe link failure message, performing a software check on software that is designed to move data within the storage engine, and indicting this compute node in response to a determination that the software check has identified a software error on this compute node, performing a unique stamp self-test, and indicting this compute node in response to a determination that this compute node has failed the unique stamp self-test. In response to a determination that this compute node has not failed any of the tests, indicting the other compute node.

In some embodiments, in response a determination that the second LERDS has been received from the other compute node, the method further includes implementing a vital instance comparison check before comparing the first LERDS with the second LERDS to determine whether only one of the compute nodes has reported an error or if both compute nodes have reported an error.

In some embodiments, the vital instance comparison check includes determining whether this compute node is a default compute node or a not default compute node, the default compute node being a pre-selected compute node to indict in instances where the deterministic hardware indictment process results in neither compute node otherwise being selected, and determining a number of active vital instances on this compute node, determining a number of active vital instances on the other compute node. In response to a determination that this compute node is the default compute node, and that this compute node has less than a threshold number of vital instances, indicting this compute node. In response to a determination that this compute node is the default compute node, that this compute node has the threshold number of vital instances and that the other compute node has less than the threshold number of vital instances, indicting the other compute node. In response to a determination that this compute node is not the default compute node, and that the other compute node has less than a threshold number of vital instances, indicting the other compute node. In response to a determination that this compute node is not the default compute node, that the other compute node has the threshold number of vital instances and that this compute node has less than the threshold number of vital instances, indicting this compute node. In response to a determination that this compute node has the threshold number of vital instances and that the other compute node has the threshold number of vital instances, indicting neither compute node.

In some embodiments, the error comparison process includes an ordered series of error comparison tests ranked in descending order of severity, and wherein the error comparison process is configured to indict either this compute node or the other compute node in response to a determination that either this compute node or the other compute node has failed one of the ordered series of error comparison tests.

In some embodiments, the ordered series of error comparison tests includes a self-indictment error test, a heartbeat test, an intranode bus health check, a vital emulation health check, a total emulation health check, a PCIe link failure check, a software check associated with on software that is designed to move data within the storage engine, and one or more unique stamp tests.

In some embodiments, a storage engine having two compute nodes interconnected by a Peripheral Component Interconnect Express (PCIe) Non-Transparent Bridge (NTB), each compute node being configured to implement a method of deterministic hardware indictment in response to occurrence of a fatal error on the PCIe NTB, the deterministic hardware indictment method being configured to result in both compute nodes determining the same indictment decision in response to occurrence of the fatal error on the PCIe NTB. In some embodiments, the deterministic indictment method includes identifying occurrence of the fatal error on the PCIe NTB, generating a first Local Error Reporting Data Structure (LERDS) containing information about a state of hardware and software components on this compute node, transmitting the first LERDS generated on this compute node to the other compute node using a transmission medium separate from the NTB, and determining if a second LERDS has been received from the other compute node. In response to a determination that the second LERDS has not been received from the other compute node, using the first LERDS that this compute node generated to perform a self-indictment check and indicting either this compute node or the other compute node based on the result of the self-indictment check. In response a determination that the second LERDS has been received from the other compute node, comparing the first LERDS with the second LERDS to determine whether only one of the compute nodes has reported an error or if both compute nodes have reported an error. In response to a determination that only one of the compute node has reported an error, indicting the compute node that reported the error. In response to a determination that both compute nodes have reported errors, comparing the first LERDS with the second LERDS to perform an error comparison process, and determining, from the error comparison process, whether one of the compute nodes has reported a more sever error. In response to a determination that one of the compute nodes has reported a more severe error, indicting the one of the compute nodes. In response to a determination that both compute nodes have reported errors with equal severity, indicting a default compute node.

In some embodiments, the deterministic indictment method further includes, in response to identifying occurrence of the fatal error on the PCIe NTB, shutting down the NTB by one compute node or by both compute nodes to prevent further transactions from occurring on the NTB.

In some embodiments, transmitting the first LERDS generated on this compute node to the other compute node, includes generating a User Datagram Protocol (UDP) datagram and transmitting the UDP datagram containing the first LERDS to the other compute node.

In some embodiments, the first LERDS contains information identifying any local errors, information identifying any hardware components have been faulted, and information identifying any fatal software errors, timeouts, and system state or performance statistics.

In some embodiments, determining if the second LERDS has been received from the other compute node includes writing a discernable pattern to a data structure, waiting a predetermined period of time, while waiting the predetermined time, writing a payload of any message received from the other compute node on the transmission medium separate from the NTB, upon expiration of the predetermined period of time, reading the data structure and comparing the content of the data structure with the discernable pattern. In response to a determination that the data structure contains the discernable pattern, determining that the second LERDS has not been received. In response to a determination that at least a portion of the data structure does not contain the discernable pattern, determining that the second LERDS has been received and reading the second LERDS from the data structure.

In some embodiments, the self-indictment check includes performing a self-indict error check, and indicting this compute node in response to a determination that this compute node contains any self-indict error messages, performing a heartbeat check, and indicting the other compute node in response to a determination that the heartbeat check indicates a heartbeat failure, performing a PCIe root complex check, and indicting this compute node in response to a determination that an error has been identified in the PCIe root complex on this compute node, performing a PCIe link failure check, and indicting the other compute node in response to a determination that the PCIe link failure check identifies a PCIe link failure message, performing a software check on software that is designed to move data within the storage engine, and indicting this compute node in response to a determination that the software check has identified a software error on this compute node, performing a unique stamp self-test, and indicting this compute node in response to a determination that this compute node has failed the unique stamp self-test. In response to a determination that this compute node has not failed any of the tests, indicting the other compute node.

In some embodiments, in response a determination that the second LERDS has been received from the other compute node, the deterministic indictment method further includes implementing a vital instance comparison check before comparing the first LERDS with the second LERDS to determine whether only one of the compute nodes has reported an error or if both compute nodes have reported an error.

In some embodiments, the vital instance comparison check includes determining whether this compute node is a default compute node or a not default compute node, the default compute node being a pre-selected compute node to indict in instances where the deterministic hardware indictment process results in neither compute node otherwise being selected, determining a number of active vital instances on this compute node, and determining a number of active vital instances on the other compute node. In response to a determination that this compute node is the default compute node, and that this compute node has less than a threshold number of vital instances, indicting this compute node. In response to a determination that this compute node is the default compute node, that this compute node has the threshold number of vital instances and that the other compute node has less than the threshold number of vital instances, indicting the other compute node. In response to a determination that this compute node is not the default compute node, and that the other compute node has less than a threshold number of vital instances, indicting the other compute node. In response to a determination that this compute node is not the default compute node, that the other compute node has the threshold number of vital instances and that this compute node has less than the threshold number of vital instances, indicting this compute node. In response to a determination that this compute node has the threshold number of vital instances and that the other compute node has the threshold number of vital instances, indicting neither compute node.

In some embodiments, the error comparison process includes an ordered series of error comparison tests ranked in descending order of severity, and wherein the error comparison process is configured to indict either this compute node or the other compute node in response to a determination that either this compute node or the other compute node has failed one of the ordered series of error comparison tests.

In some embodiments, the ordered series of error comparison tests includes a self-indictment error test, a heartbeat test, an intranode bus health check, a vital emulation health check, a total emulation health check, a PCIe link failure check, a software check associated with on software that is designed to move data within the storage engine, and one or more unique stamp tests.

BRIEF DESCRIPTION OF THE DRAWINGS

FIG. 7 is flow chart of a portion of the deterministic indictment process of FIG. 5 implemented by each compute node as a self-indictment process when the compute node does not receive a local error reporting data structure from the other compute node, according to some embodiments.

FIG. 8 is flow chart of a portion of the deterministic indictment process of FIG. 5 implemented by each compute node as a vital instance comparison check implemented when the compute node does receive a local error reporting data structure from the other compute node, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
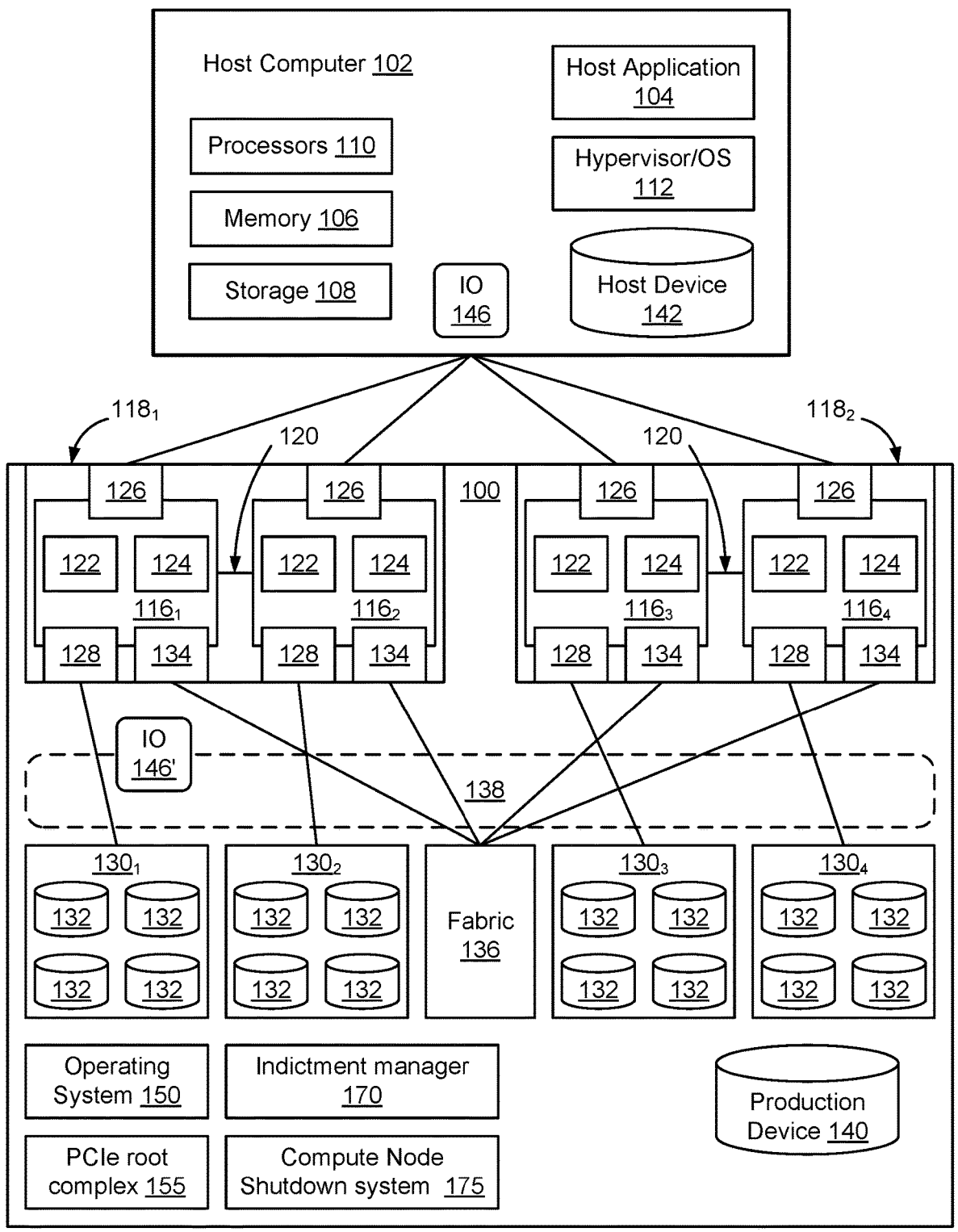
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

Figure 2:
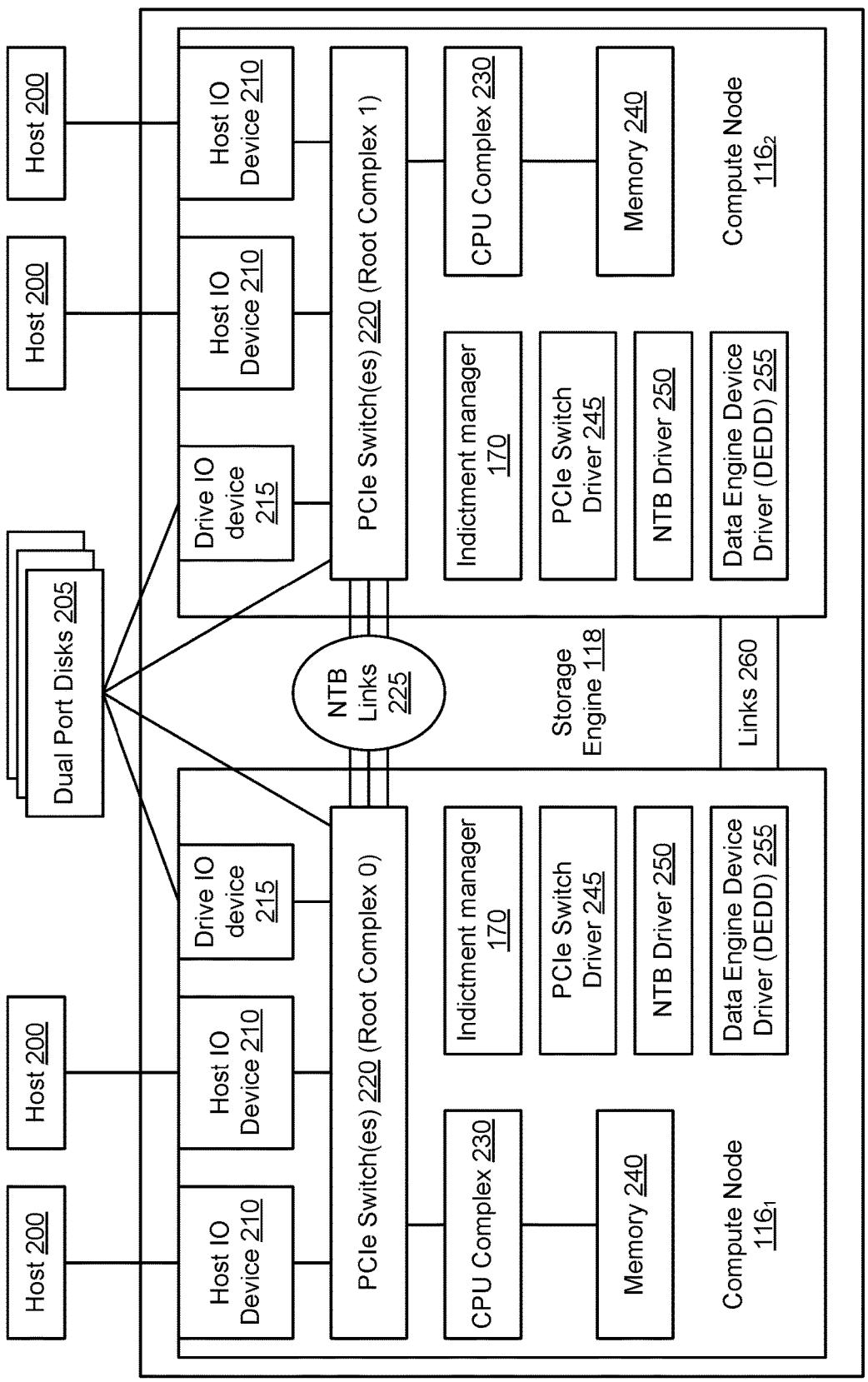
FIG. 2 is a functional block diagram an example storage engine having two compute nodes with separate PCIe root complexes, interconnected with a set of PCIe Non-Transparent Bridge (NTB) links, according to some embodiments.

FIG. 2 is a functional block diagram an example storage engine 118 having two compute nodes 116. Each compute node 116 has a separate PCIe root complexes 230 (root complex 0 and root complex 1), interconnected with a set of PCIe Non-Transparent Bridge (NTB) links 225.

As shown in FIG. 2, in some embodiments each compute node 116 includes a set of host IO devices 210. Host IO devices 210 may be implemented as Subscriber Line Interface Card (SLIC) devices, each of which has a Fibre Channel (FC) driver that manages host IO operations on the host IO device 210 and controls operation of the host IO device 210. The host IO devices 210 receive IO read and write operations from hosts 200, and hardware and firmware of the host IO devices 210 manage the host IO read and write operations. In some embodiments, host read and write IO operations by one node on the memory 240 of the peer node are implemented via PCIe switch 220 over PCIe NTB links 225. The PCIe NTB links 225 are links that are configured to interconnect different PCIe root complexes.

As shown in FIG. 2, in some embodiments each compute node 116 includes one or more drive IO devices 215 configured to access one or more dual port disks 205. Each compute node 116 may also include a Data Engine Device Driver (DEDD) 225, which is software that is designed to move data within the storage engine 118. The compute nodes 116 may also include one or more drivers, such as a PCIe switch driver 245 and NTB driver 250 configured to control operation of the PCIe switch 220 and NTB links 225, respectively. It should be understood that the compute nodes 116 may include numerous components that have not been included in FIG. 2 for ease of illustration.

A storage engine 118 includes a pair (two) independent compute nodes 116 interconnected by a set of Peripheral Component Interconnect Express (PCIe) Non-Transparent Bridge (NTB) links 225. Each compute node 116 is implemented using separate hardware, and the two compute nodes 116 are configured to provide redundancy within the storage engine 118. If an error occurs on all of the PCIe NTB links 225, one of the compute nodes 116 should be indicted to prevent the error from spreading within the storage engine 118, and perhaps causing a loss of data. A compute node 116 may be implemented as a blade in a storage system 100. A "blade", as that term is used herein, is a compact, self-contained server that includes core processing components and memory, that has a modular design and is configured to fit into an enclosure with other blades in a larger storage system.

When a fatal fault on all the NTB links 225 interconnecting a pair of compute nodes 116 occurs, one of the compute nodes 116 must be fenced off from the memory subsystem (including, especially, from the customer data). Since the NTB link 225 has an endpoint on each compute node 116 in the engine, fatal errors on the NTB links 225 do not always pinpoint the origin of the bad hardware. However, a hardware indictment must nonetheless be made.

According to some embodiments, a deterministic hardware indictment process is implemented on each compute node 116 upon occurrence of a fatal error on the NTB links 225 interconnecting the two compute nodes 116. A fatal error, as that term is used herein, is used to refer to an uncorrectable PCIe error on the NTB link 225. The errors are standardized through latest PCI specification, PCI Express Base Specification Revision 6.0.1, Version 1.0. In some embodiments, the PCIe switch driver or the NTB driver 250 include an uncorrectable error status register, and upon occurrence of an error, a respective bit is set in the uncorrectable error status register. When an error occurs, an indictment manager 170 is used to determine which compute node 116 should be indicted. Any fatal error, if not masked, will generate a fatal error interrupt (MSIX) or a Non-Maskable Interrupt (NMI). Once a fatal error occurs on all NTB links 225, an indictment manager 170 on each compute node 116 implements the same deterministic process to determine which compute node 116 should be indicted.

In some embodiments, each compute node 116 only knows the status about itself. To determine whether the indictment manager 170 should indict itself or the other compute node 116, each compute node 116 needs to know the status of the other compute node 116, and the same heuristic must be used by the indictment manager 170 on both compute nodes 116 to ensure that both compute nodes 116 come to the same indictment every time, hence ensuring that the solution is deterministic.

Additionally, when a fatal error occurs on the PCIe NTB 225, the information gathered on each compute node 116 needs be gathered quickly. For example, in some embodiments the indictment manager 170 implements a deterministic process that does not include processes such as PCIe configuration reads, which are costly timewise and can be very damaging if the PCIe bus is already under stress.

Further, since the fatal error occurred on the PCIe NTB links that are used to interconnect the PCIe root complexes of the compute nodes, any exchange of status information between the compute nodes 116 must be done out of band—not on the PCIe NTB links. According to some embodiments, the exchange of status information between the compute nodes 116 is implemented using User Datagram Protocol (UDP). UDP uses a simple connectionless communication model, such that when a UDP datagram is sent, the receiving node is not required to send an acknowledgment. UDP also provides a checksum for data integrity. According to some embodiments, when a fatal error occurs on the NTB links, the NTB links are shut down and each compute node 116 transmits a UDP datagram to the other compute node 116 on other communication links 260 requesting status information. Each compute node 116 collects its status information and responds with a second UDP datagram containing status information from the respective compute node 116.

In some embodiments, UDP is used to communicate between the compute nodes 116 because UDP is lightweight and does not require the compute node 116 that sent the UDP datagram to wait for a response. This enables the compute node 116 to initiate the deterministic indictment process earlier. In some embodiments, the indictment manager software 170 sends a UDP request to all the nodes on the compute node 116, asking for peer compute node 116 status. Any node on the compute node 116 can respond, and the status provided by the first node to respond is used by the other node to implement the deterministic indictment process. In some embodiments, the compute node 116 indictment manager 170 periodically sends a request for status information from the other compute node 116, and will timeout after a small timeout, for example on the order of 150 ms. Upon detecting a failure, each compute node 116 begins damage control by dropping the PCIe NTB ports, so that no additional read or write operations are queueing. Rather, the indictment manager software 170 is used to determine which hardware to keep alive and which hardware should be indicted.

Figure 3:
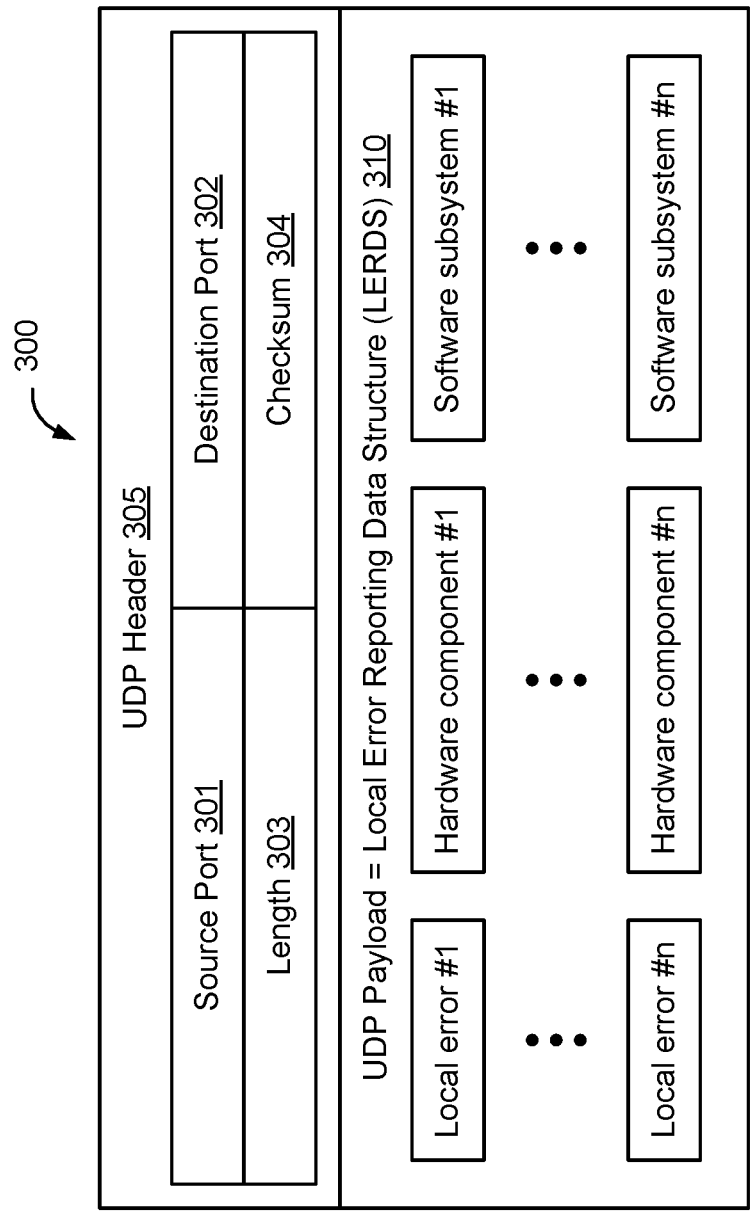
FIG. 3 is a functional block diagram of the example UDP datagram containing a Local Error Reporting Data Structure (LERDS), according to some embodiments.

FIG. 3 is a functional block diagram of an example UDP datagram containing a Local Error Reporting Data Structure (LERDS) 310, according to some embodiments. As shown in FIG. 3, in some embodiments upon occurrence of a fatal error, each compute node 116 packages its local system state into a data structure referred to herein as a Local Error Reporting Data Structure (LERDS) 310. The local error reporting data structure 310, in some embodiments, includes information identifying any local errors 315. The local error reporting data structure 310 also includes the state of local hardware components 320, for example if some hardware components have already been faulted. The local error reporting data structure 310 also includes the state of local software subsystems 325, to identify any fatal software errors, timeouts, performance statistics, or other errors or system state that may enable software errors on the two compute nodes 116 to be identified.

As described in greater detail in connection with FIGS. 4-10, in some embodiments each compute node 116 has a compute node 116 indictment manager 170 that implements a deterministic indictment process upon occurrence of a fatal error on the PCIe NTB 225. The deterministic indictment process, in some embodiments, involves exchanging local error reporting data structures 310 between the compute nodes 116, and using the content of the local error reporting data structures 310 to determine which of the compute nodes 116 has experienced a failure or, if both are experiencing failure, which compute node 116 is experiencing a worse failure. It should be understood that, in some embodiments, each compute node 116 populates the local error reporting data structure 310 to include all system state information required by the other compute node 116 to enable the compute node 116 indictment manager 170 on the other compute node 116 to implement the deterministic indictment process described herein. For example, in embodiments where the deterministic indictment process implemented by both compute nodes 116 includes a comparison of 10 particular pieces of information, such as errors of various types, the LERDS 310 includes status information relevant to each of the 10 particular pieces of information required by the compute nodes 116 to implement the deterministic indictment process. By causing each compute node 116 to populate the LERDS 310 with a set of information required to implement the deterministic indictment process, it is possible for each compute node 116 to independently arrive at the same indictment decision, thus preventing a possible situation where both compute nodes 116 are indicted.

Figure 4:
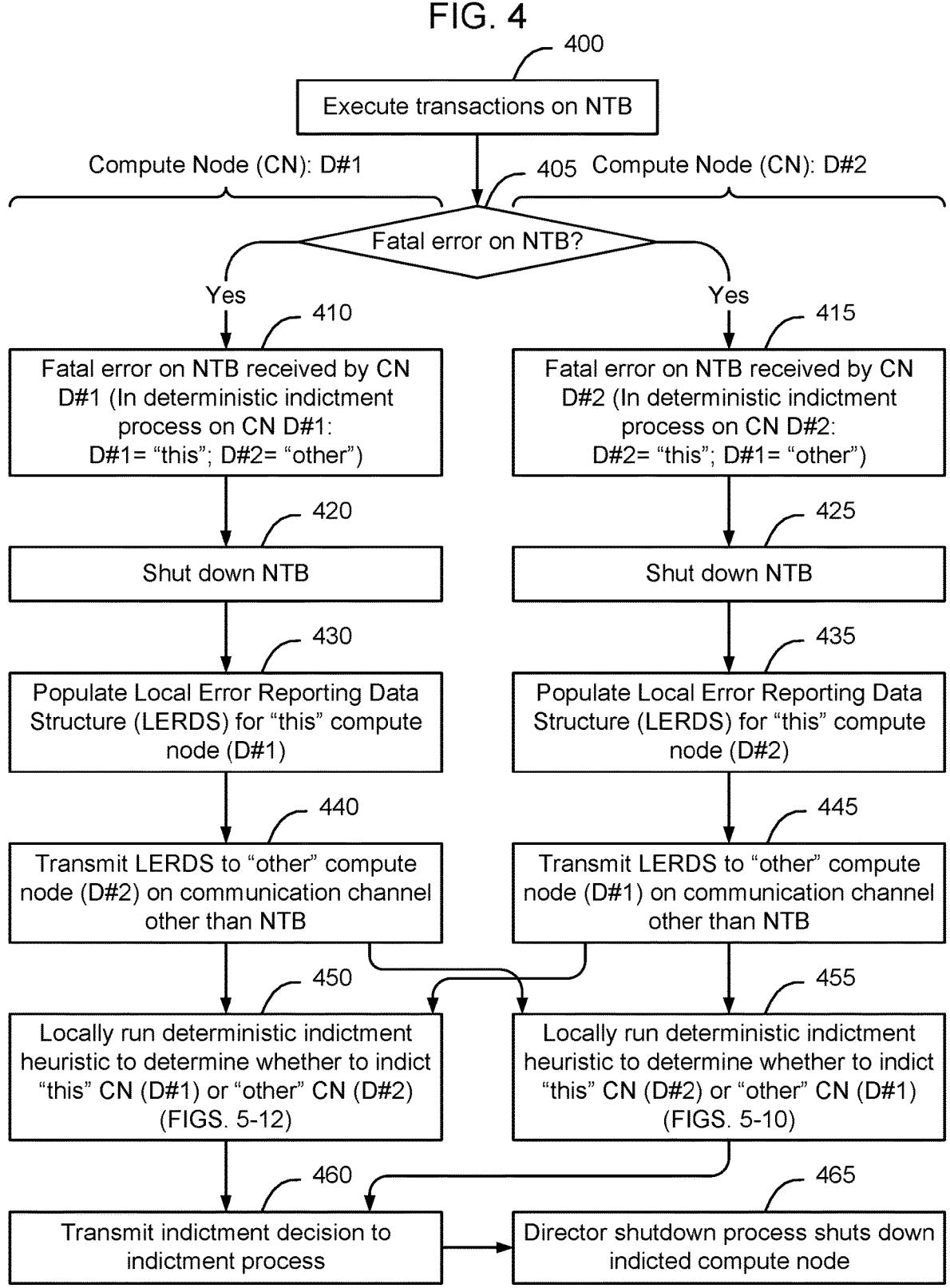
FIG. 4 is flow chart of a method of implementing a hardware indictment process in response to occurrence of a fatal error on a PCIe NTB by compute nodes interconnected by the PCIe NTB, according to some embodiments.

FIG. 4 is flow chart of a method of implementing a hardware indictment process in response to occurrence of a fatal error on a PCIe NTB 225 by compute nodes 116 interconnected by the PCIe NTB, according to some embodiments. As shown in FIG. 4, during normal operation each compute node 116 is able to execute transactions (read and write IO operations) on the memory 240 of the other compute node 116 over the NTB (block 400). The PCI-e NTB is a point-to-point PCIe bus connecting memory subsystems from two different compute nodes 116 through a memory window. It allows for one compute node 116 to seamlessly access memory 240 residing on the other compute node 116.

A challenge in using NTB 225 comes from when there is a fatal error on packets that are in flight. Fatal errors are received by both compute nodes 116 simultaneously. Accordingly, indictment manager software 170 on each compute node 116 is challenged to quickly determine which side of the NTB needs to be indicted and replaced. If the wrong compute node 116 is indicted, the faulty compute node 116 is allowed to resume and potentially create more damage as it continues to queue errors. What began as a fatal error on the NTB bus could devolve into a fatal error on the compute node 116 CPU, or worse, both compute nodes 116 may be indicted, resulting in a catastrophic system failure for both compute nodes 116 of the storage engine 118.

If a fatal error occurs on the NTB 225 (a determination of YES at block 405), each compute node 116 will initiate a deterministic indictment process to determine which compute node 116 should be indicted. As used herein, the term "indict" refers to isolation of the compute node 116 to prevent the compute node 116 from taking subsequent action or having access to host data on the storage system 100. Once an indictment decision has been made by the compute nodes 116, the indictment decision is passed to a compute node 116 shutdown process 175 which causes the compute node 116 to be shut down within the storage engine 118. The compute node 116 may subsequently be investigated by customer support and reactivated/rebooted, or may need to be physically replaced depending on the cause of the indictment.

As shown in FIG. 4, when a fatal error occurs on the PCIe NTB, the fatal error will be detected by both compute nodes 116 (blocks 410, 415). In FIG. 4, actions taken by compute node 116 #1 (D #1) are shown on the left-hand column (blocks 410, 420, 430, 440, and 450), and actions taken by compute node 116 #2 (D #2) are shown on the right-hand column (blocks 415, 425, 435, 445, and 455). In some embodiments, the deterministic indictment process implemented by both compute nodes 116 requires each compute node 116 to determine whether to indict itself (this compute node 116) or to indict its peer (other compute node 116). Both compute nodes 116 (D #1 and D #2) use the same concept of referring to itself as "this" and its peer compute node 116 as "other". Accordingly, as shown in FIG. 4, when compute node 116 #1 (D #1) implements the deterministic indictment process, D #1="this" compute node 116, and D #2="other" compute node 116. When compute node 116 #2

(D #2) implements the deterministic indictment process, D #2="this" compute node 116, and D #3="other" compute node 116.

When compute node 116 #1 receives the fatal error on the NTB (block 410) compute node 116 #1 shuts down the NTB 225 on compute node 116 #1 (block 420). Likewise, when compute node 116 #2 receives the fatal error on the NTB 225 (block 410) compute node 116 #1 shuts down the NTB on compute node 116 #2 (block 425). Both compute node 116 #1 and compute node 116 #2 populate a local error reporting data structure 310 (blocks 430, 435), and each compute node 116 transmits its populated LERDS 310 to the other compute node 116 (blocks 440, 445). In some embodiments, transmission of the LERDS 310 between compute nodes 116 occurs out of band—not on the NTB 225—since the NTB 225 has been shut down to prevent the failure from spreading. There are instances where one of the compute nodes 116 may be experiencing failure and is unable to populate or transmit a LERDS 310, and the deterministic indictment process described in greater detail in connection with FIGS. 5-10 is configured to accommodate situations where one of the does not receive a LERDS 310 from the other compute node 116.

Each compute node 116 locally runs a deterministic indictment process to determine whether to indict "this" compute node 116 or to indict the "other" compute node 116 (blocks 450, 455). As noted above, each compute node 116 refers to itself as "this" compute node 116 and refers to the peer compute node 116 as the "other" compute node 116. Accordingly, in some embodiments the deterministic indictment process will return opposite results on both compute nodes 116. Stated differently, in instances where the deterministic indictment process on compute node 116 #1 returns an indictment determination that "this" compute node 116 should be indicted, the deterministic indictment process on compute node 116 #2 will return an indictment determination that the "other" compute node 116 should be indicted. Vice versa, in instances where the deterministic indictment process on compute node 116 #1 returns an indictment determination that the "other" compute node 116 should be indicted, the deterministic indictment process on compute node 116 #2 will return an indictment determination that "this" compute node 116 should be indicted. Additional details about one example deterministic indictment process utilized by the compute nodes 116 in blocks 450, 455, are described in connection with FIGS. 5-10.

In this manner, both compute nodes 116 will arrive at the same indictment decision such that both compute node 116 #1 and compute node 116 #2 will independently determine to indict compute node 116 #1, or both compute node 116 #1 and compute node 116 #2 will independently determine to indict compute node 116 #2. Once the compute nodes 116 arrive at an indictment decision, the indictment decision is transmitted to an indictment shutdown process 175 (block 460) and the compute node 116 shutdown process 175 shuts down the indicted compute node 116 to implement the indictment decision on the storage engine 118 (block 465).

Figure 5:
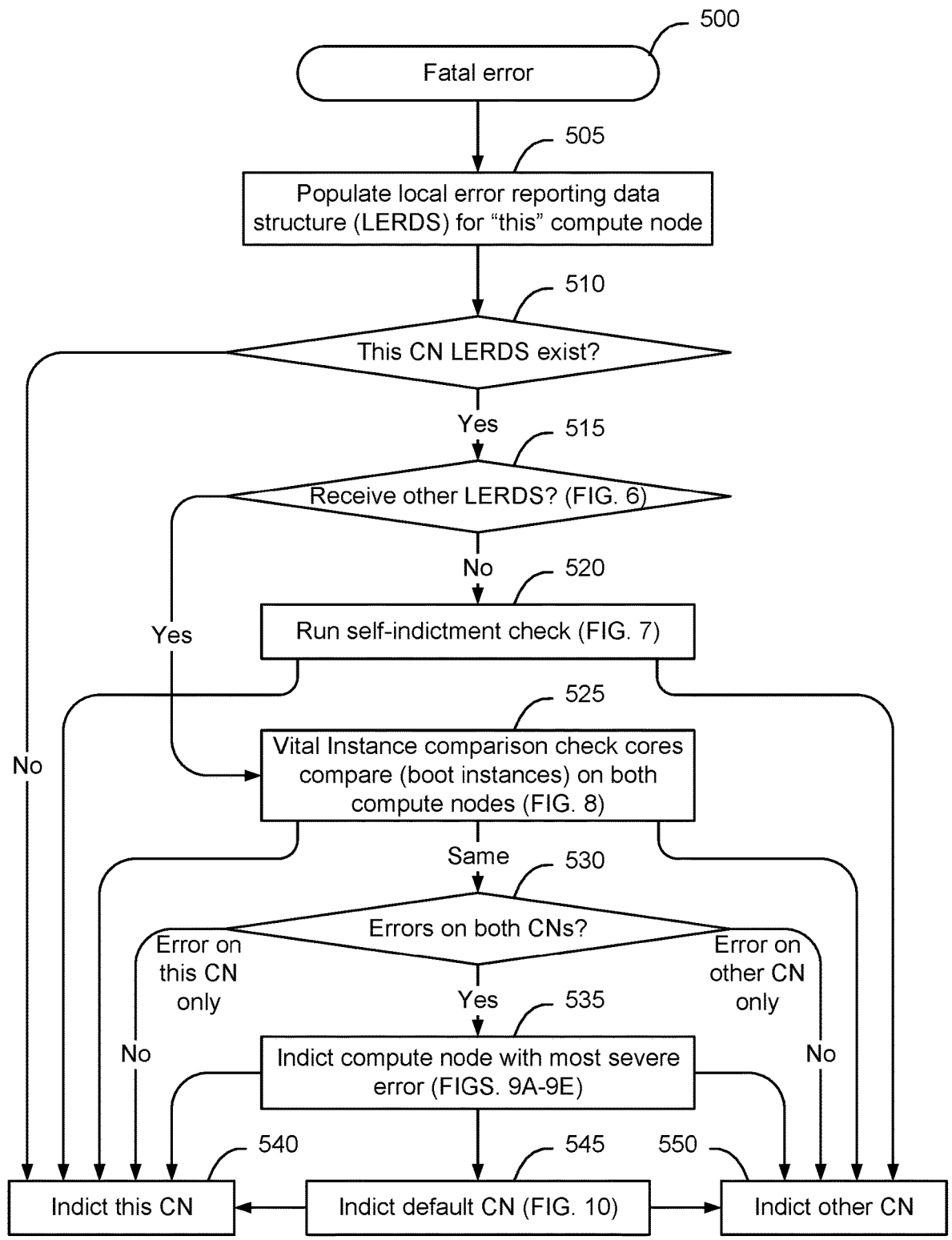
FIG. 5 is flow chart of a method of a deterministic indictment process implemented by each compute node in response to occurrence of a fatal error on a PCIe NTB, according to some embodiments.

FIG. 5 is flow chart of a method of a deterministic indictment process implemented by each compute node 116 in response to occurrence of a fatal error on a PCIe NTB, according to some embodiments. It should be understood that the deterministic indictment process shown in FIG. 5, and aspects of the deterministic indictment process of FIG. 5 that are described in greater detail in connection with FIGS. 6-10, is only one example process. It should be understood that other deterministic indictment processes may be used as well depending on the implementation, or that aspects of the described deterministic indictment process may be implemented in different order, depending on the embodiment. The deterministic indictment process described in connection with FIGS. 5-10 is intended to make indictment decisions based on more serious errors earlier in the deterministic indictment process, and gradually proceed to consideration of less series errors at later steps of the deterministic indictment process. Further, although multiple stages of the deterministic indictment process will be described, it should be understood that once an indictment decision is made (FIG. 5, block 540=indict this compute node 116, or FIG. 5, block 550=indict other compute node 116), the deterministic indictment process ends and the indictment decision is transmitted (FIG. 4, block 460) to enable the indictment decision to be implemented on the storage engine 118.

FIG. 5 shows an example deterministic indictment process implemented by each compute node 116 upon occurrence of a fatal error (block 500). As shown in FIG. 5, when a compute node 116 identifies occurrence of a fatal error (block 500), the compute node 116 will populate a local error reporting data structure (LERDS) 310 for "this" compute node 116 (block 505). As noted above, each compute node 116 refers to itself as "this compute node 116" in the deterministic indictment process.

In some embodiments, the compute node 116 determines whether the LERDS 310 for this compute node 116 exists (block 510). If the compute node 116 is unable to create or populate a LERDS 310, for example because the compute node 116 is experiencing failure, (a determination of NO at block 510), in some embodiments the deterministic indictment process results in a decision to indict this compute node 116 (block 540).

If "this" compute node 116 LERDS 310 exists (a determination of YES at block 510), the compute node 116 determines whether it has received a LERDS 310 from the other compute node 116 (block 515). An example process of determining whether this compute node 116 has received a LERDS 310 from the other compute node 116 is described in greater detail in connection with FIG. 6. If this compute node 116 has not received a LERDS 310 from the other compute node 116 (a determination of NO at block 515) this compute node 116 runs a self-indictment check (block 520). An example process of implementing a self-indictment check is described in greater detail in connection with FIG. 7.

If this compute node 116 has received a LERDS 310 from the other compute node 116 (a determination of YES at block 515), this compute node 116 uses the LERDS 310 from this compute node 116 and the LERDS 310 from the other compute node 116 to implement a vital instance comparison check, to compare the number of boot instances on both compute nodes 116 (block 525). Additional details associated with performing a vital instance check is set forth below in connection with FIG. 8. If an indictment decision is not able to be made based on the vital instance comparison (a determination that the compute nodes 116 have the same vital instances), the deterministic indictment process determines whether there are errors on one compute node 116 (a determination of NO at block 530) or errors on both compute nodes 116 (a determination of YES at block 530). In instances where this compute node 116 determines that only one of the compute nodes 116 has reported errors (a determination of NO at block 530), in some embodiments the deterministic indictment process results in a decision to indict the compute node 116 that reported one or more errors (block 540 or block 550). For example, in some embodiments if the LERDS 310 from this compute node 116 contains one or more errors and the LERDS 310 from the other compute node 116 contains no errors, the deterministic indictment process results in a decision to indict this compute node 116 (block 540). By contrast, if the LERDS 310 from this compute node 116 contains no errors and the LERDS 310 from the other compute node 116 contains one or more errors, the deterministic indictment process results in a decision to indict the other compute node 116 (block 550).

In some embodiments, if both compute nodes 116 report errors (a determination of YES at block 530), the deterministic indictment process compares the reported errors, and indicts the compute node 116 with the most severe reported error (block 535). An example process of determining which compute node 116 has reported the most severe error is described in greater detail in connection with FIGS. 9A-9E. If the deterministic indictment process does not result in an indictment of one of the compute nodes 116 based on the severity of the reported errors, in some embodiments the deterministic indictment process identifies a default compute node 116 to indict (block 545). An example process of identifying a default compute node 116 to indict is described in greater detail in connection with FIG. 10. In some embodiments, once the deterministic indictment process begins, the deterministic indictment process results in indictment of either this compute node 116 (block 540) or the other compute node 116 (block 550). Once the indictment decision has been made (block 540, 550), the indictment is implemented by the compute node 116 shutdown system 175 on the storage engine 118 to disable the compute node 116 and isolate the compute node 116 to prevent the indicted compute node 116 from operating in the storage engine 118.

Figure 6:
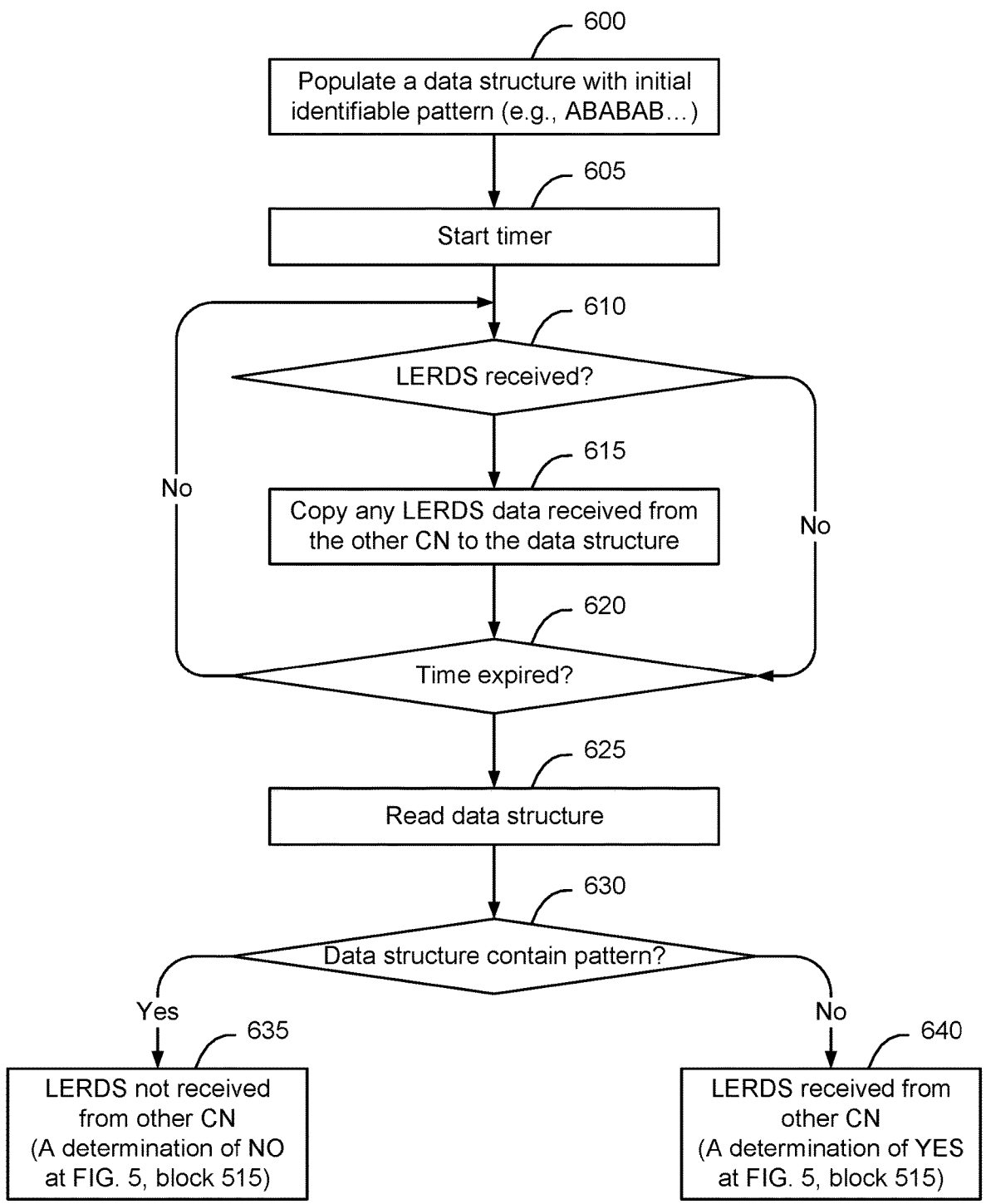
FIG. 6 is flow chart of a portion of the deterministic indictment process of FIG. 5 implemented by each compute node to determine whether the compute node has received a local error reporting data structure from the other compute node, according to some embodiments.

FIG. 6 is flow chart of a portion of the deterministic indictment process of FIG. 5 implemented by each compute node 116 to determine whether the compute node 116 has received a local error reporting data structure (LERDS) 310 from the other compute node 116 (FIG. 5, block 515), according to some embodiments. As shown in FIG. 6, in some embodiments the compute node 116 indictment manager 170 is configured to store a LERDS 310, if received from the other compute node 116, in a particular data structure such as a file. To enable the compute node 116 indictment manager 170 to quickly determine whether a LERDS 310 has been received from the other compute node 116, the compute node 116 indictment manager 170 initially populates the data structure with an identifiable pattern, such as ABABABABAB . . . (block 600). The particular pattern will depend on the particular embodiment, and merely is used to enable the compute node 116 indictment manager 170 to determine quickly whether the LERDS 310 from the other compute node 116 has been stored to the data structure.

In some embodiments, the deterministic indictment process is configured to wait a predetermined period of time to receive a LERDS 310 from the other compute node 116. Accordingly, in some embodiments the compute node 116 indictment manager 170 starts a timer (block 605). An example period of time may be on the order of 150 microseconds, although the particular duration of the timer will depend on the particular implementation. If a LERDS 310 is received (a determination of YES at block 610), any data from the LERDS 310 that is received from the other compute node 116 is copied to the data structure (block 615). While a LERDS 310 is not received (a determination of NO at block 610), and the timer has not expired (a determination of NO at block 620), the deterministic indictment process waits.

Upon expiration of the timer (a determination of YES at block 620) the deterministic indictment process reads the data structure (block 625) to determine if the data structure contains the initial identifiable pattern (block 630). Upon a determination that the data structure contains the initial identifiable pattern (a determination of YES at block 630), the deterministic indictment process results in a decision that the LERDS 310 from the other compute node 116 has not been received (block 635), which results in a determination of NO at block 515 of FIG. 5. Upon a determination that at least part of the data structure contains information other than the initial identifiable pattern (a determination of NO at block 630), the deterministic indictment process results in a decision that the LERDS 310 from the other compute node 116 has been received (bock 640), which results in a determination of YES at block 515 of FIG. 5.

FIG. 7 is flow chart of a portion of the deterministic indictment process of FIG. 5 implemented by each compute node 116 as a self-indictment process (FIG. 5, block 520) when the compute node 116 does not receive a local error reporting data structure 310 from the other compute node 116, according to some embodiments. As shown in FIG. 7, during the deterministic indictment process, when this compute node 116 determines that it has not received a LERDS 310 from the other compute node 116, there are two possible explanations. A first explanation is that the other compute node 116 is experiencing failure and should be indicted. A second explanation is that this compute node 116 is experiencing failure and should be indicted. Accordingly, failure to receive a LERDS 310 from the other compute node 116 does not automatically result in a decision to indict the other compute node 116. Rather, as shown in FIG. 7, in some embodiments the deterministic indictment process uses a self-indictment process to make an indictment decision.

As shown in FIG. 7, in some embodiments the self-indictment check includes a self-indict failure check (block 705). A compute node 116 can indict itself if it knows that it has experienced failure. Likewise, other compute nodes 116 can indict a compute node 116 and send a self-indictment error message to the compute node 116 if they identify the compute node 116 as experiencing failure. For example, software executing on this compute node 116 may know that it has encountered a fatal error, such as a watchdog error, etc., and can flag this compute node 116 as having a self-indictment error. Accordingly, during the self-indictment check, if this compute node 116 identifies that it has a self-indict failure (a determination of YES at block 705), in some embodiments the deterministic indictment process results in a decision to indict this compute node 116 (FIG. 5, block 540).

In instances where this compute node 116 does not have a self-indict failure (a determination of NO at block 705), the self-indictment check of the deterministic indictment process determines whether there has been a heartbeat failure—whether a set of heartbeat messages has not been received from the other compute node 116 (block 710). In some embodiments this compute node 116 and the other compute node 116 are configured to send heartbeat signals to each other. In instances where a given number of heartbeat messages (e.g., two heartbeat messages) are not received by this compute node 116 from the other compute node 116 (a determination of YES at block 710), in some embodiments the deterministic indictment process results in a decision to indict the other compute node 116 (FIG. 5, block 550).

In instances where this compute node 116 does not identify a heartbeat failure (a determination of NO at block 710), the self-indictment check of the deterministic indictment process determines whether there is a failure of the PCIe root complex on this compute node 116 (block 715). A PCIe root complex is a hardware component that connects the CPU to the PCIe bridge/bus and issues transactions on the PCIe bridge. The PCIe root complex may be a separate hardware component, or the functionality of the PCIe root complex may be in the chipset and/or CPU. In response to a determination that there is a failure of the PCIe root complex on this node (a determination of YES at block 715), in some embodiments the deterministic indictment process results in a decision to indict this compute node 116 (FIG. 5, block 540).

In instances where this compute node 116 does not identify a failures of the PCIe root complex on this compute node 116 (a determination of NO at block 715), the self-indictment check of the deterministic indictment process determines whether there is a link failure notification on this compute node 116 from the PCIe switch (block 720). A link failure from the PCIe switch is often caused by a hardware interrupt generated by the switch that is connected to the NTB. Specifically, if this compute node 116 has received a link failure notification, the link failure notification is probably caused by a failure of the other compute node 116. Accordingly, in response to a determination that there is a link failure from the PCIe switch (a determination of YES at block 720), in some embodiments the deterministic indictment process results in a decision to indict the other compute node 116 (FIG. 5, block 550).

In instances where this compute node 116 does not identify a link failure from the PCIe switch on this compute node 116 (a determination of NO at block 720), the self-indictment check of the deterministic indictment process determines whether there is a DEDD failure (block 725). As noted above, the Data Engine Device Driver (DEDD) in some embodiments is a software engine that is configured to move data within the storage engine 118. A failure identified by the DEDD can be associated with a CRC error in the data or may be associated with multiple other types of data errors. Often, with a DEDD failure, it is difficult to determine whether this compute node 116 was the source of the DEDD failure or whether the other compute node 116 was the cause of the DEDD failure. However, in the context of implementing a self-indictment check, in some embodiments the deterministic indictment process is configured to indict the other compute node 116 when a DEDD failure is identified (a determination of YES at block 725). Accordingly, in response to a determination that there is a DEDD failure (a determination of YES at block 725), in some embodiments the deterministic indictment process results in a decision to indict the other compute node 116 (FIG. 5, block 550).

In instances where this compute node 116 does not identify DEDD failure (a determination of NO at block 725), the self-indictment check of the deterministic indictment process uses a unique stamp test to determine if a unique stamp test link to the other compute node 116 is down (block 730). In some embodiments, a unique stamp is a value that is stored in volatile memory and is accessible to each domain locally and to the peer through the NTB link. This compute node 116 can read the unique stamp of the other compute node 116, and vice versa. To implement a unique stamp test, this compute node 116 attempts to read the unique stamp of the other compute node 116. If this compute node 116 receives an incorrect value, the other compute node 116 failed the unique stamp test and has been corrupted. If this compute node 116 receives an error code indicting that the unique stamp link is down, such as a value of FFFF, this compute node 116 knows that there is a unique stamp test link error.

According to some embodiments, the indictment check of the deterministic indictment process determines if the unique stamp test link is down (block 730). In response to a determination that the unique stamp test link is down (a determination of YES at block 730), in some embodiments the deterministic indictment process results in a decision to indict the other compute node 116 (FIG. 5, block 550). In response to a determination that the unique stamp test link is not down (a determination of NO at block 730), in some embodiments the deterministic indictment process determines whether the unique stamp test resulted in having the other compute node 116 return an incorrect unique stamp test result (block 735). In response to a determination that the other compute node 116 failed the unique stamp test (a determination of YES at block 735), in some embodiments the deterministic indictment process results in a decision to indict the other compute node 116 (FIG. 5, block 550).

In some embodiments, in response to a determination that the other compute node 116 did not fail the unique stamp test (a determination of NO at block 735), this compute node 116 determines that it has completed the self-indictment test and has detected no errors on this compute node 116 (block 740). Accordingly, in some embodiments the deterministic indictment process results in a decision to indict the other compute node 116 (FIG. 5, block 550).

FIG. 8 is flow chart of a portion of the deterministic indictment process of FIG. 5 implemented by each compute node 116 as a vital instance comparison check (FIG. 5, block 525) implemented when the compute node 116 does receive a local error reporting data structure 310 from the other compute node 116, according to some embodiments. As shown in FIG. 5, when this compute node 116 receives a LERDS 310 from the other compute node 116 (a determination of YES at block 515), this compute node 116 implements a vital instance comparison check to compare the number of boot instances on both compute node 116 (block 525). FIG. 8 shows additional details of this vital instance comparison check.

As shown in FIG. 8, in some embodiments when a vital instance comparison check is started (block 800) this compute node 116 will determine the number of core instances for this compute node 116 (block 805) and will determine the number of core instances reported by the other compute node 116 from the LERDS 310 received from the other compute node 116 (block 810).

In some embodiments, each compute node 116 should have three or more vital emulation instances (cores) to be considered healthy. In some embodiments, the vital emulations include a front-end emulation (EM) for implementing front-end host IO operations, a data services emulation (EDS), and a back-end emulation (DA) for implementing back-end host IO operations. The particular number of vital emulations required to be implemented on each compute node 116 will depend on the particular implementation.

It is possible that both compute nodes 116 might only have two core instances. To ensure that both compute nodes 116 indict the same compute node 116, in some embodiments, the compute nodes 116 determine which compute node 116 is compute node 116 A and, if compute node 116 A has two or fewer core instances, the deterministic indictment process results in a decision to indict compute node 116 A.

For example, in some embodiments this compute node 116 reads the slot ID where the compute node 116 is connected to the storage engine (block 815), and determines if this compute node 116 is connected to slot ID=0 (block 820). If this compute node 116 determines that it is connected to slot ID=0, (a determination of YES at block 820) this compute node 116 is compute node 116 A (block 825). If this compute node 116 determines that it is not connected to slot ID=0, (a determination of NO at block 820) this compute node 116 is compute node 116 B (block 840).

In response to a determination that this compute node 116 is compute node 116 A (block 825), the deterministic indictment process determines if this compute node 116 has two or fewer core instances (block 830). If the number of compute node 116 cores on this compute node 116 is less than or equal to two (a determination of YES at block 830), in some embodiments the deterministic indictment process results in a decision to indict this compute node 116 (FIG. 5, block 540). If the number of compute node 116 cores on this compute node 116 is not less than or equal to two (a determination of NO at block 830), in some embodiments the deterministic indictment process determines if the other compute node 116 has two or fewer core instances (block 835). If the number of compute node 116 cores on the other compute node 116 is less than or equal to two (a determination of YES at block 835), in some embodiments the deterministic indictment process results in a decision to indict the other compute node 116 (FIG. 5, block 550). If the number of compute node 116 cores on the other compute node 116 are also not less than or equal to two (a determination of NO at block 835), in some embodiments the deterministic indictment process does not indict either compute node 116 based on the vital instance core comparison check, and the process returns to block 530 of FIG. 5 to compare errors reported by this compute node 116 with errors reported by the other compute node 116.

In response to a determination that this compute node 116 is compute node 116 B (block 840), the deterministic indictment process determines if the other compute node 116 has two or fewer core instances (block 845). If the number of compute node 116 cores on the other compute node 116 is less than or equal to two (a determination of YES at block 845), in some embodiments the deterministic indictment process results in a decision to indict the other compute node 116 (FIG. 5, block 550). If the number of compute node 116 cores on the other compute node 116 is not less than or equal to two (a determination of NO at block 845), in some embodiments the deterministic indictment process determines if this compute node 116 has two or fewer core instances (block 850). If the number of compute node 116 cores on this compute node 116 is less than or equal to two (a determination of YES at block 850), in some embodiments the deterministic indictment process results in a decision to indict this compute node 116 (FIG. 5, block 540). If the number of compute node 116 cores on this compute node 116 are also not less than or equal to two (a determination of NO at block 850), in some embodiments the deterministic indictment process does not indict either compute node 116 based on the vital instance core comparison check, and the process returns to block 530 of FIG. 5 to compare errors reported by this compute node 116 with errors reported by the other compute node 116.

As shown in FIG. 5, in some embodiments the deterministic indictment process, at this stage, determines whether both this compute node 116 and the other compute node 116 have reported errors (block 530). In response to a determination that both this compute node 116 and the other compute node 116 have reported errors (a determination of YES at block 530), in some embodiments the deterministic indictment process indicts the compute node 116 with the most severe error. An example process of comparing the severity of reported errors by both this compute node 116 and the other compute node 116 is shown in FIGS. 9A-9E. It should be understood that the collection of error comparisons shown in FIGS. 9A-9E is intended to be one example collection of error comparisons that may be implemented. The particular collection of error comparisons that are utilized by a given deterministic indictment process may vary depending on the particular implementation.

As shown in FIG. 5, when both compute nodes 116 report errors, in some embodiments the deterministic indictment process will start an error severity comparison test (block 535). In some embodiments, the error severity comparison test is implemented using series of tests, looking for errors of decreasing severity. In instances where no compute node 116 reports an error of the particular type, or in instances where both compute nodes 116 report an error of the particular type, the error severity comparison test moves to the next test in the series of tests. If only one compute node 116 reports an error of the given type, in some embodiments the compute node 116 that has reported the error of the given type is selected to be indicted.

Figure 9A:
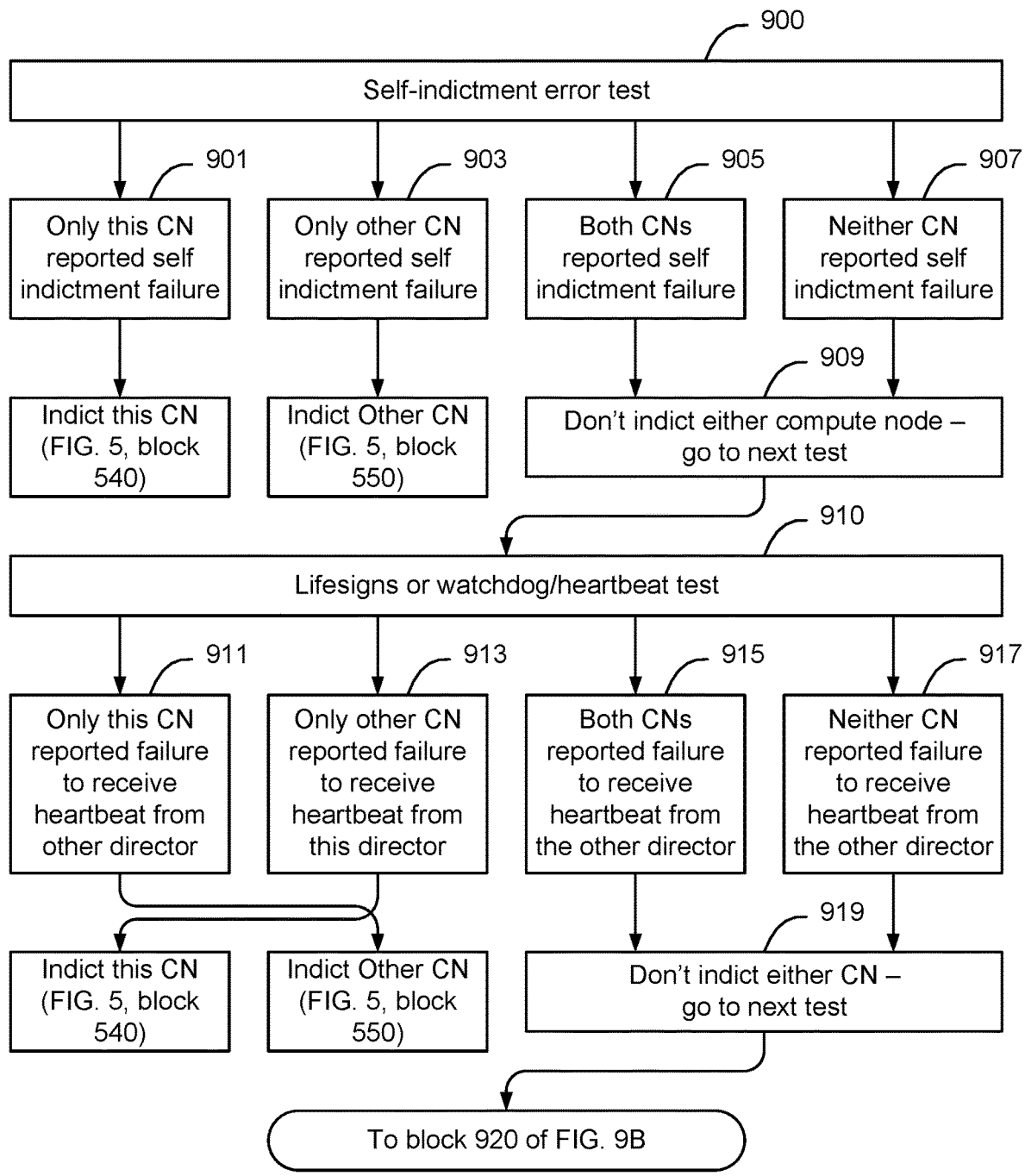
FIGS. 9A-9E are a flow chart of a portion of the deterministic indictment process of FIG. 5 implemented when errors are reported on both compute nodes, to indict the compute node with the most severe reported error, according to some embodiments.

FIGS. 9A-9E are a flow chart of a portion of the deterministic indictment process of FIG. 5 implemented when errors are reported on both compute nodes 116, to indict the compute node 116 with the most severe reported error, according to some embodiments. As shown in FIG. 9A, in some embodiments the error severity comparison process includes a self-indictment test (block 900) to determine if only this compute node 116 has reported a self-indictment error (block 901), if only the other compute node 116 has reported a self-indictment error (block 903), if both compute nodes 116 have reported self-indictment errors (block 905), or if neither compute node 116 has reported self-indictment errors (block 907).

In response to a determination that only this compute node 116 has reported a self-indictment error (block 901), in some embodiments the deterministic indictment process results in a decision to indict this compute node 116 (FIG. 5, block 540). In response to a determination that only the other compute node 116 has reported a self-indictment error (block 903), in some embodiments the deterministic indictment process results in a decision to indict the other compute node 116 (FIG. 5, block 550). In response to a determination that both compute nodes 116 have reported self-indictment errors (block 905), or in response to a determination that neither compute node 116 has reported self-indictment errors (block 907), in some embodiments the deterministic indictment process doesn't indict either compute node 116 (block 909), and the deterministic indictment process proceeds to the next error severity comparison test.

As shown in FIG. 9A, in some embodiments the next error severity comparison test is a life signs or watchdog/heartbeat test (block 910). Specifically, in some embodiments the deterministic indictment process determines if only this compute node 116 has reported a failure to receive a heartbeat from the other compute node 116 (block 911), if only the other compute node 116 has reported a failure to receive a heartbeat from this compute node 116 (block 913), if both compute nodes 116 have reported a failure to receive a heartbeat from the respective other compute node 116 (block 915), or if neither compute node 116 has reported a failure to receive a heartbeat from the respective other compute node 116 (block 917).

In response to a determination that only this compute node 116 has reported a heartbeat failure (block 911), in some embodiments the deterministic indictment process results in a decision to indict the other compute node 116 (FIG. 5, block 550). In response to a determination that only the other compute node 116 has reported a heartbeat failure (block 913), in some embodiments the deterministic indictment process results in a decision to indict this compute node 116 (FIG. 5, block 540). In response to a determination that both compute nodes 116 have reported heartbeat failures (block 915), or in response to a determination that neither compute node 116 has reported a heartbeat failure (block 917), in some embodiments the deterministic indictment process doesn't indict either compute node 116 (block 919), and the deterministic indictment process proceeds to the next error severity comparison test, which is shown in FIG. 9B.

Figure 9B:
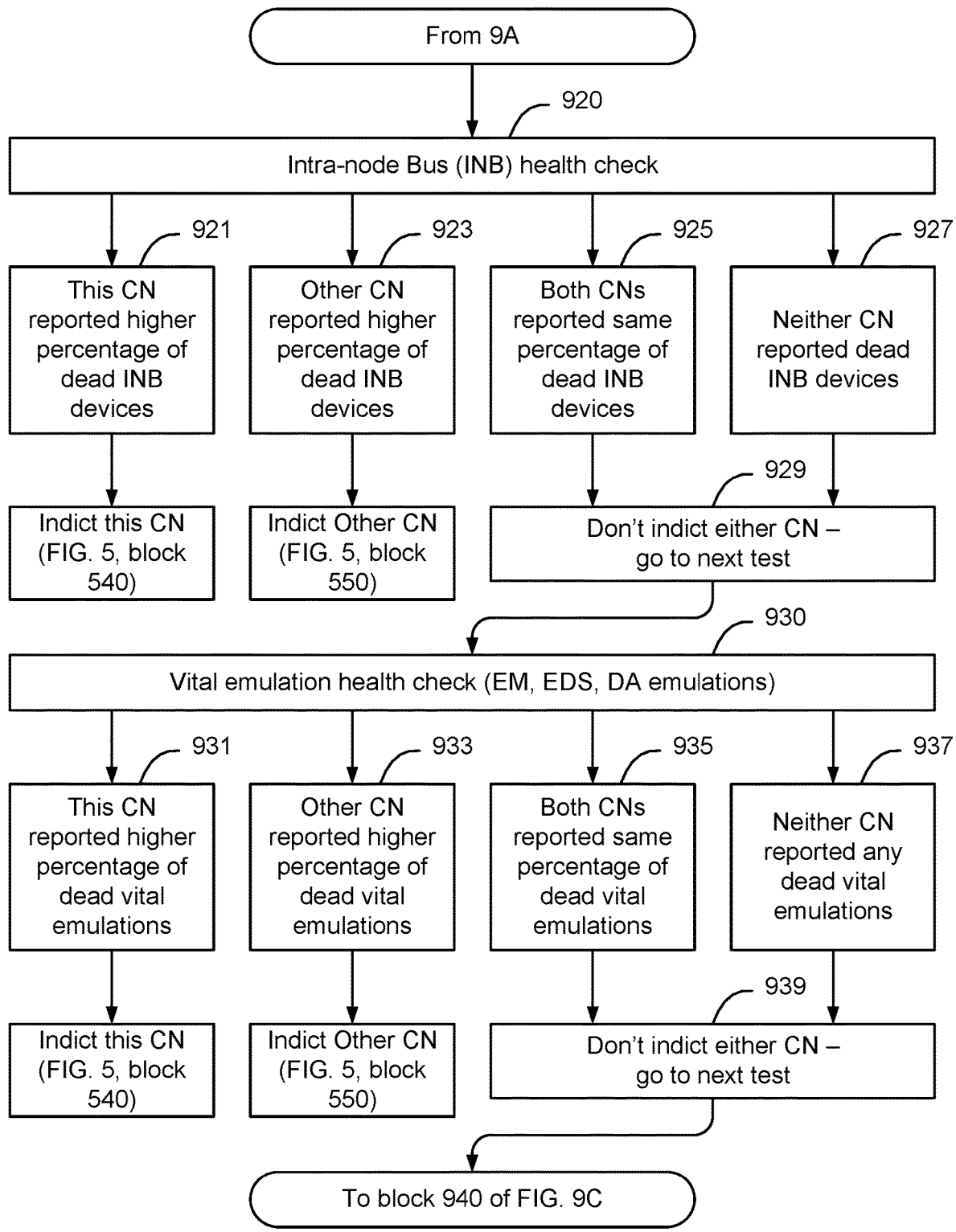

As shown in FIG. 9B, in some embodiments the next error severity comparison test is a Non-Transparent Bridge (NTB) links 225 health check (block 920). Specifically, in some embodiments the deterministic indictment process determines if this compute node 116 has reported a higher number of dead NTB devices than the other compute node 116 (block 921), if the other compute node 116 has reported a higher number of dead NTB devices than this compute node 116 (block 923), if both compute nodes 116 have reported the same number of dead NTB devices (block 925), or if neither compute node 116 has reported any dead NTB devices (block 927). NTB devices, in some embodiments, are ports connected to the NTB links 225.

In response to a determination that this compute node 116 has reported a higher number of dead NTB devices than the other compute node 116 (block 921), in some embodiments the deterministic indictment process results in a decision to indict this compute node 116 (FIG. 5, block 540). In response to a determination that the other compute node 116 has reported a higher number of dead NTB devices than this compute node 116 (block 923), in some embodiments the deterministic indictment process results in a decision to indict the other compute node 116 (FIG. 5, block 550). In response to a determination that both compute nodes 116 have reported the same number of dead NTB devices (block 925), or in response to a determination that neither compute node 116 has reported dead NTB devices (block 927), in some embodiments the deterministic indictment process doesn't indict either compute node 116 (block 929), and the deterministic indictment process proceeds to the next error severity comparison test.

As shown in FIG. 9B, in some embodiments the next error severity comparison test is a vital emulation health check (block 930), which compares the number of vital emulations active on each of the compute nodes 116. In some embodiments, the vital emulations include a front-end emulation (EM) for implementing front-end host IO operations, a data services emulation (EDS), and a back-end emulation (DA) for implementing back-end host IO operations. The particular number of vital emulations required to be implemented on each compute node 116 will depend on the particular implementation.

As shown in FIG. 9B, in some embodiments the deterministic indictment process determines if only this compute node 116 has reported a higher number of dead vital emulations than the other compute node 116 (block 931), if only the other compute node 116 has reported a higher number of dead vital emulations than this compute node 116 (block 933), if both compute nodes 116 have reported the same number of vital emulations (block 935), or if neither compute node 116 has reported any dead vital emulations (block 937).

In response to a determination that only this compute node 116 has reported a higher number of dead vital emulations than the other compute node 116 (block 931), in some embodiments the deterministic indictment process results in a decision to indict this compute node 116 (FIG. 5, block 540). In response to a determination that only the other compute node 116 has reported a higher number of dead vital emulations than this compute node 116 (block 933), in some embodiments the deterministic indictment process results in a decision to indict the other compute node 116 (FIG. 5, block 550). In response to a determination that both compute nodes 116 have reported the same number of dead vital emulations (block 935), or in response to a determination that neither compute node 116 has reported dead vital emulations (block 937), in some embodiments the deterministic indictment process doesn't indict either compute node 116 (block 939), and the deterministic indictment process proceeds to the next error severity comparison test, which is shown in FIG. 9C.

Figure 9C:
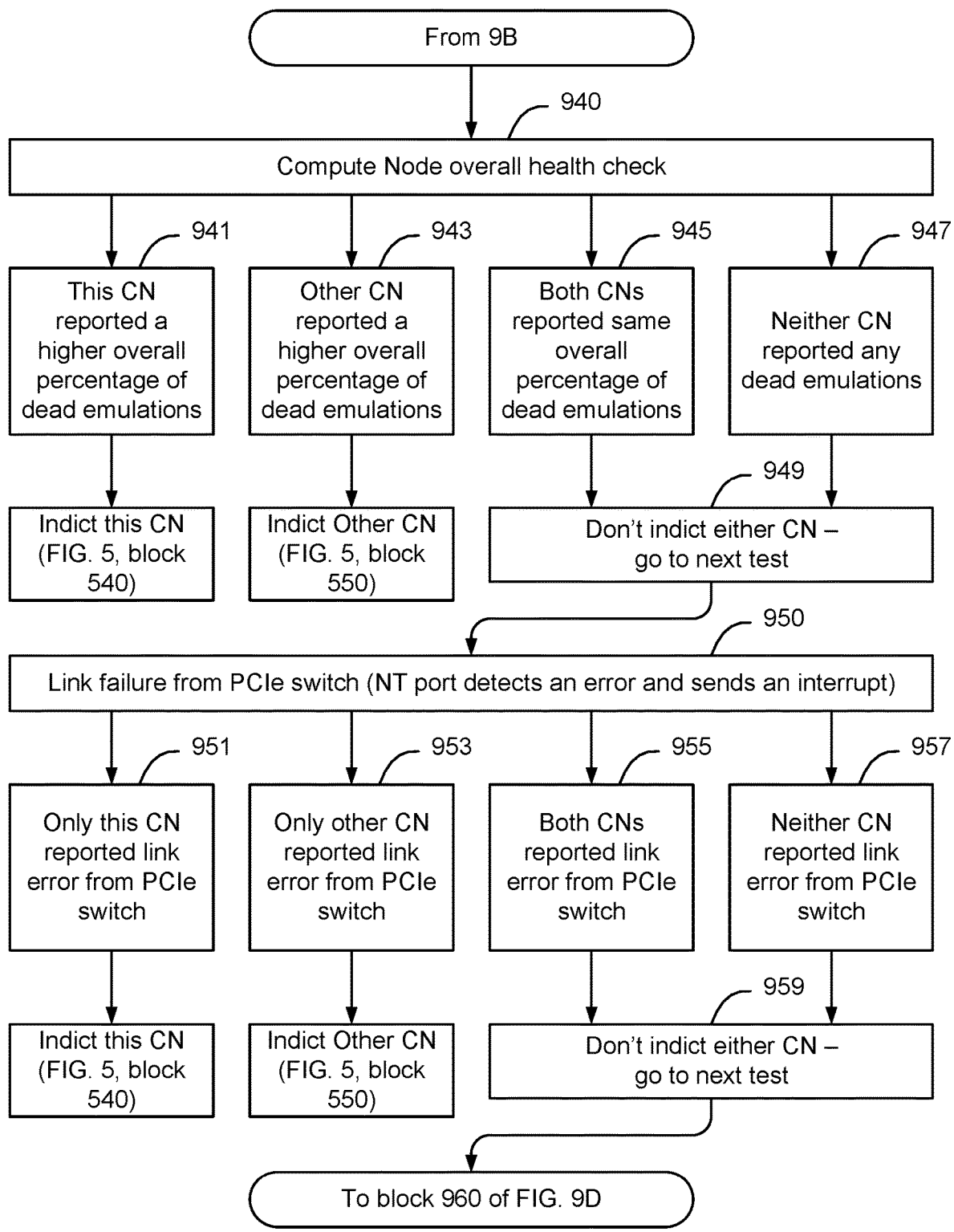

As shown in FIG. 9C, in some embodiments the deterministic indictment process performs an overall health check (block 940) by determining if this compute node 116 has reported a higher number of total dead emulations than the other compute node 116 (block 941), if the other compute node 116 has reported a higher number of total dead emulations than this compute node 116 (block 943), if both compute nodes 116 have reported the same number of total dead emulations (block 945), or if neither compute node 116 has reported any dead emulations (block 947).

In response to a determination that this compute node 116 has reported a higher total number of dead emulations than the other compute node 116 (block 941), in some embodiments the deterministic indictment process results in a decision to indict this compute node 116 (FIG. 5, block 540). In response to a determination that the other compute node 116 has reported a higher total number of dead emulations than this compute node 116 (block 943), in some embodiments the deterministic indictment process results in a decision to indict the other compute node 116 (FIG. 5, block 550). In response to a determination that both compute nodes 116 have reported the same total number of dead emulations (block 945), or in response to a determination that neither compute node 116 has reported any dead emulations (block 947), in some embodiments the deterministic indictment process doesn't indict either compute node 116 (block 949), and the deterministic indictment process proceeds to the next error severity comparison test.

As shown in FIG. 9C, in some embodiments the deterministic indictment process performs a link failure test (block 950) to determine if either or both of the compute nodes 116 reported a link failure from the PCIe switch. A PCIe switch failure can occur where the NTB port detects an error and sends an interrupt on the link, that is lodged as a link failure on the other compute node 116. In some embodiments, the deterministic indictment process performs a link failure test by determining if only this compute node 116 has reported a PCIe link failure (block 951), if only the other compute node 116 has reported a PCIe link failure (block 953), if both compute nodes 116 have reported PCIe link failures (block 955), or if neither compute node 116 has reported a PCIe link failure (block 957).

In response to a determination that this compute node 116 has reported a PCIe link failure (block 951), in some embodiments the deterministic indictment process results in a decision to indict this compute node 116 (FIG. 5, block 540). In response to a determination that the other compute node 116 has reported a PCIe link failure (block 953), in some embodiments the deterministic indictment process results in a decision to indict the other compute node 116 (FIG. 5, block 550). In response to a determination that both compute nodes 116 have reported PCIe link failures (block 955), or in response to a determination that neither compute node 116 has reported a PCIe link failure (block 957), in some embodiments the deterministic indictment process doesn't indict either compute node 116 (block 959), and the deterministic indictment process proceeds to the next error severity comparison test, which is shown in FIG. 9D.

Figure 9D:
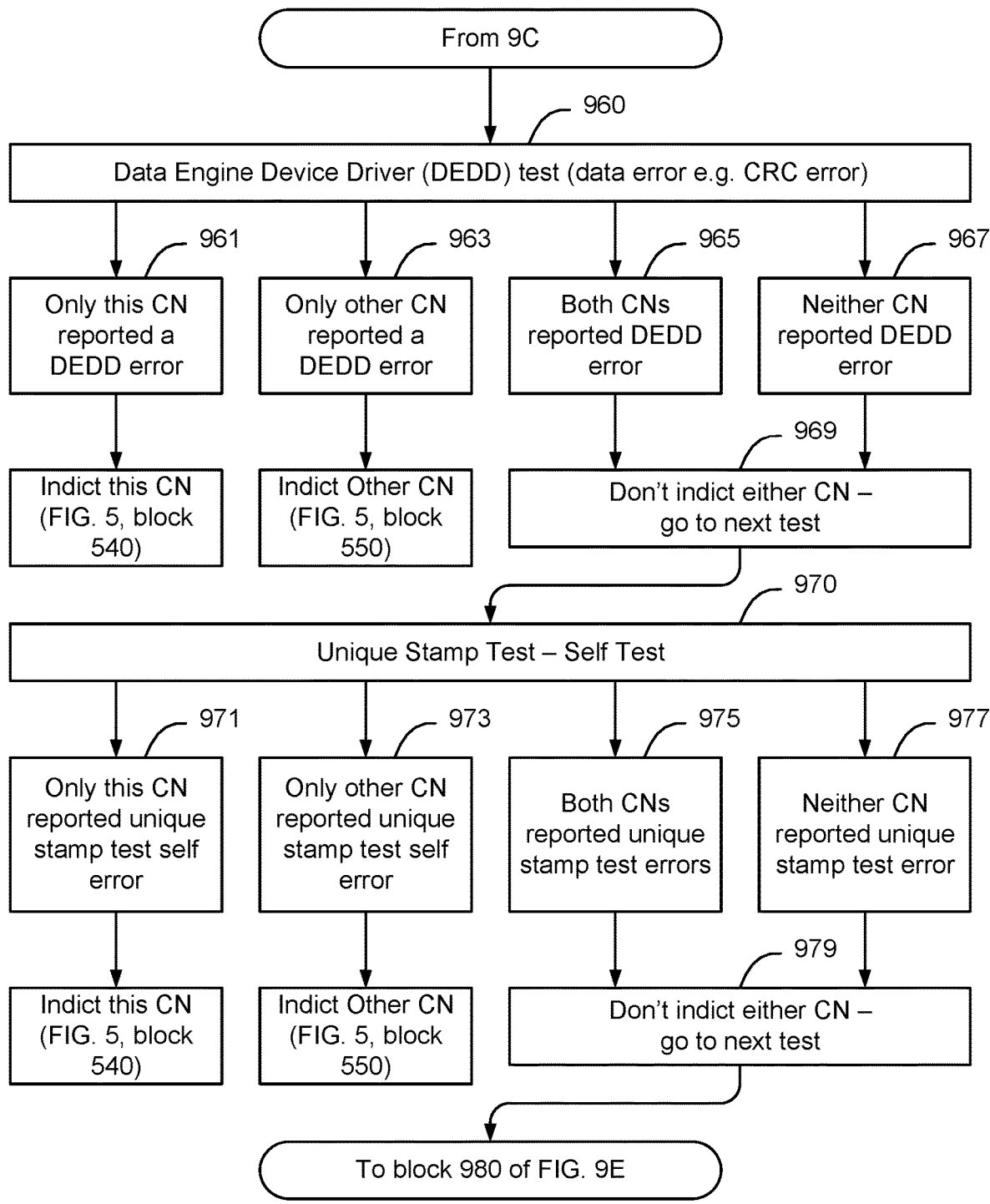

As shown in FIG. 9D, in some embodiments the deterministic indictment process performs a Data Engine Device Driver (DEDD) test to determine if either or both of the compute nodes 116 reported DEDD errors (block 960). DEDD errors may involve multiple types of errors, and frequently are associated with data errors such as a CRC error. In some embodiments, the deterministic indictment process performs a DEDD error test by determining if only this compute node 116 has reported a DEDD error (block 961), if only the other compute node 116 has reported a DEDD error (block 963), if both compute nodes 116 have reported DEDD errors (block 965), or if neither compute node 116 has reported a DEDD error (block 967).

In response to a determination that only this compute node 116 has reported a DEDD error (block 961), in some embodiments the deterministic indictment process results in a decision to indict this compute node 116 (FIG. 5, block 540). In response to a determination that only the other compute node 116 has reported a DEDD error (block 963), in some embodiments the deterministic indictment process results in a decision to indict the other compute node 116 (FIG. 5, block 550). In response to a determination that both compute nodes 116 have reported DEDD errors (block 965), or in response to a determination that neither compute node 116 has reported a DEDD error (block 967), in some embodiments the deterministic indictment process doesn't indict either compute node 116 (block 969), and the deterministic indictment process proceeds to the next error severity comparison test.

As shown in FIG. 9D, in some embodiments the deterministic indictment process performs a unique stamp test—self test—to determine if either or both of the compute nodes 116 reported unique stamp self-test errors (block 970). In some embodiments, a unique stamp test involves reading a unique stamp. A unique stamp self-test is implemented by having a compute node 116 read its own unique stamp. In some embodiments, the deterministic indictment process performs a unique stamp self-test by determining if only this compute node 116 has reported a unique stamp self-test error (block 971), if only the other compute node 116 has reported a unique stamp self-test error (block 973), if both compute nodes 116 have reported unique stamp self-test errors (block 975), or if neither compute node 116 has reported a unique stamp self-test error (block 977).

In response to a determination that only this compute node 116 has reported a unique stamp self-test error (block 971), in some embodiments the deterministic indictment process results in a decision to indict this compute node 116 (FIG. 5, block 540). In response to a determination that only the other compute node 116 has reported a unique stamp self-test error (block 973), in some embodiments the deterministic indictment process results in a decision to indict the other compute node 116 (FIG. 5, block 550). In response to a determination that both compute nodes 116 have reported unique stamp self-test errors (block 975), or in response to a determination that neither compute node 116 has reported a unique stamp self-test error (block 977), in some embodiments the deterministic indictment process doesn't indict either compute node 116 (block 979), and the deterministic indictment process proceeds to the next error severity comparison test, which is shown in FIG. 9E.

Figure 9E:
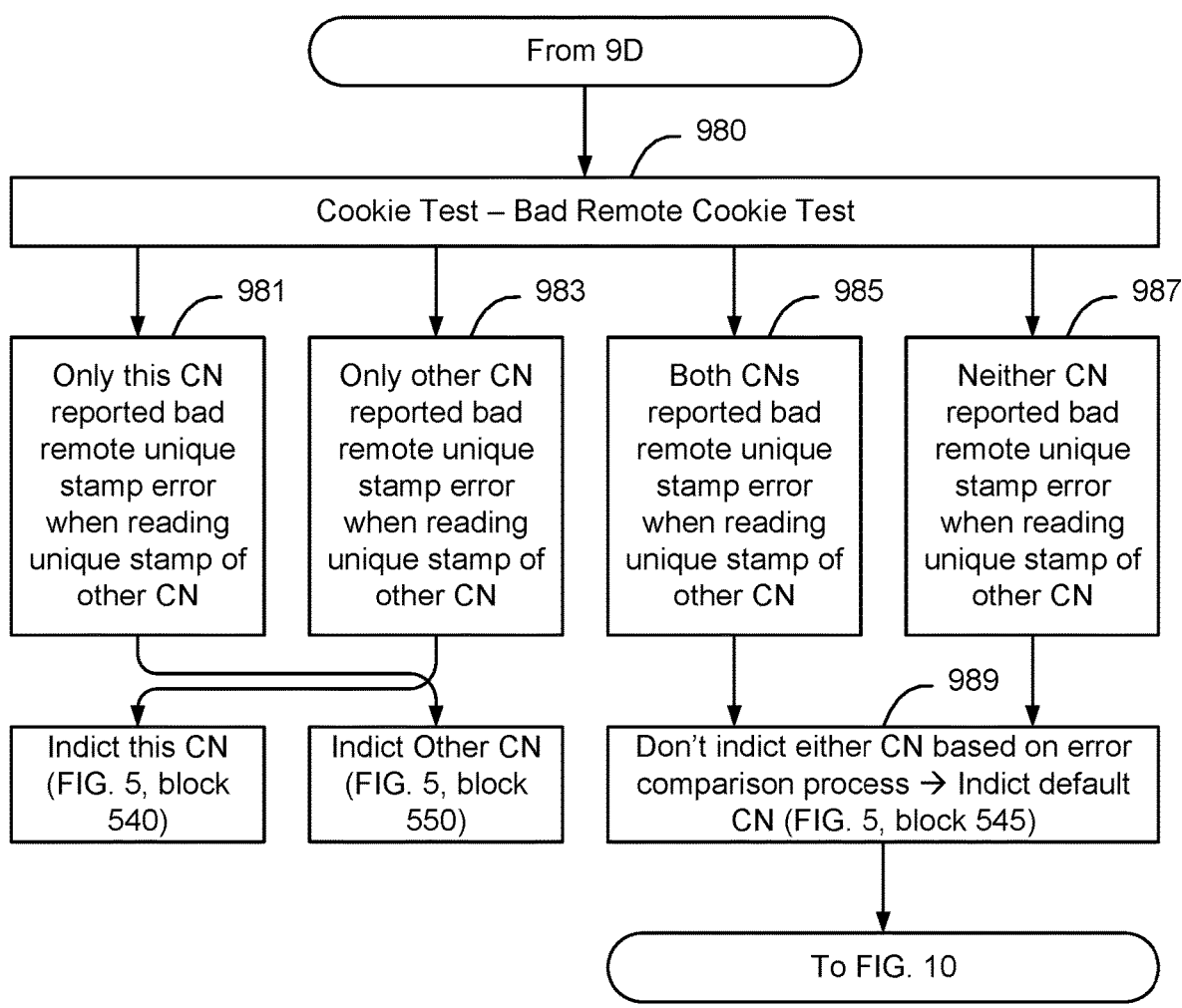

As shown in FIG. 9E, in some embodiments the deterministic indictment process performs a unique stamp test to determine if either or both of the compute nodes 116 reported unique stamp test errors (block 980). In some embodiments, a unique stamp test involves having this compute node 116 read the unique stamp of the other compute node 116. A unique stamp test error on this compute node 116, accordingly, means that when this compute node 116 attempted to read the other compute node 116's unique stamp an incorrect value was received or no unique stamp was returned. In some embodiments, the deterministic indictment process performs a unique stamp test by determining if only this compute node 116 has reported a unique stamp test error (block 981), if only the other compute node 116 has reported a unique stamp test error (block 983), if both compute nodes 116 have reported unique stamp test errors (block 985), or if neither compute node 116 has reported a unique stamp test error (block 987).

In response to a determination that only this compute node 116 has reported a unique stamp test error (block 981), in some embodiments the deterministic indictment process results in a decision to indict the other compute node 116 (FIG. 5, block 550). In response to a determination that only the other compute node 116 has reported a unique stamp test error (block 983), in some embodiments the deterministic indictment process results in a decision to indict this compute node 116 (FIG. 5, block 540). In response to a determination that both compute nodes 116 have reported unique stamp test errors (block 985), or in response to a determination that neither compute node 116 has reported a unique stamp test error (block 987), in some embodiments the deterministic indictment process doesn't indict either compute node 116 (block 989). At this point, both compute nodes 116 have reported equivalent errors, and the process returns to FIG. 5, block 545, where a default compute node 116 is selected to be indicted. Additional details about selecting a default compute node 116 to be indicted are shown in connection with FIG. 10.

Figure 10:
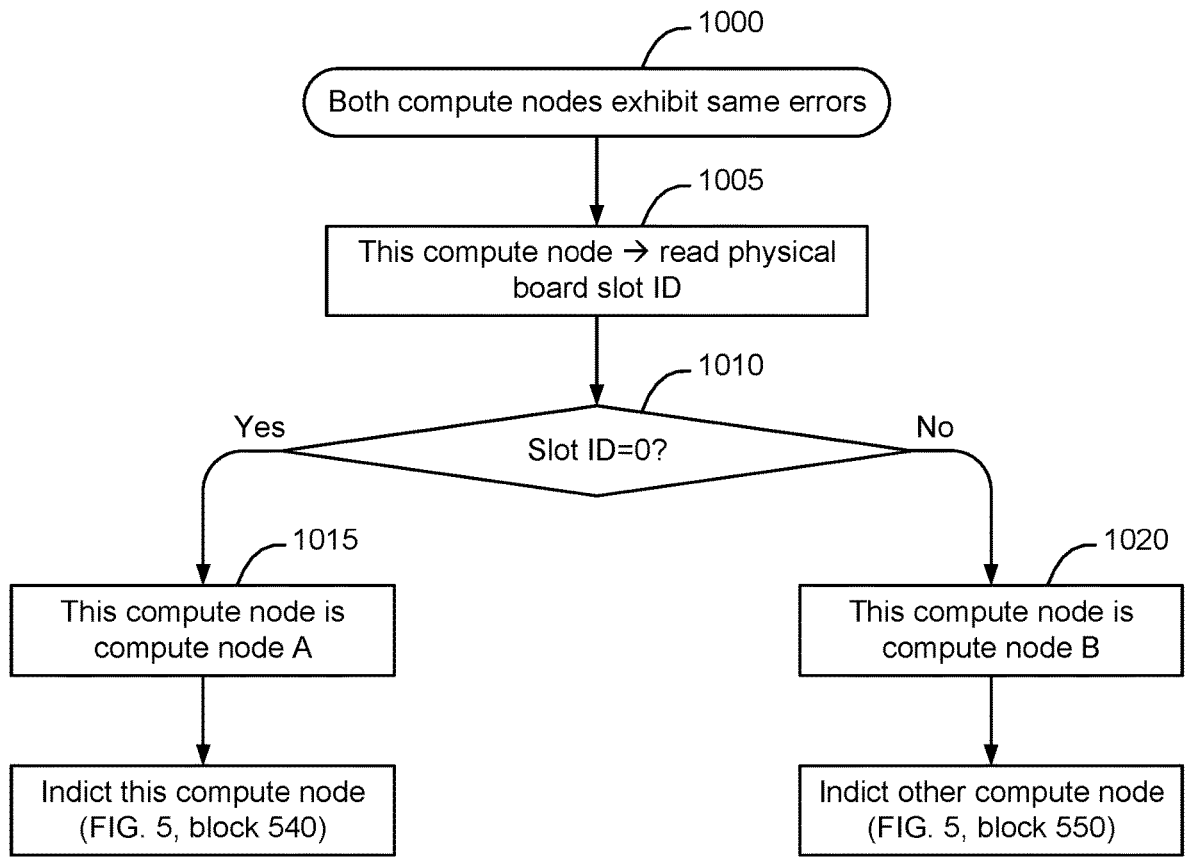
FIG. 10 is a flow chart of a portion of the deterministic indictment process of FIG. 5 implemented when both compute nodes have equivalent errors, to indict a default compute node, according to some embodiments.

FIG. 10 is a flow chart of a portion of the deterministic indictment process of FIG. 5 implemented when both compute nodes 116 have equivalent errors, to indict a default compute node 116, according to some embodiments. As shown in FIG. 10, in some embodiments when both compute nodes 116 exhibit the same errors (block 1000), the deterministic indictment process indicts compute node 116 A. It should be understood that the deterministic indictment process could elect to indict compute node 116 B instead, and the default compute node 116 to indict will depend on the particular implementation.

In some embodiments, to determine whether this compute node 116 is compute node 116 A, this compute node 116 reads the slot ID where the compute node 116 is connected to the storage engine (block 1005), and determines if this compute node 116 is connected to slot ID=0 (block 1010). If this compute node 116 determines that it is connected to slot ID=0, (a determination of YES at block 1010) this compute node 116 is compute node 116 A (block 1015) and in some embodiments the deterministic indictment process results in a decision to indict the this compute node 116 (FIG. 5, block 540). If this compute node 116 determines that it is not connected to slot ID=0, (a determination of NO at block 1010) this compute node 116 is compute node 116 B (block 1020) and in some embodiments the deterministic indictment process results in a decision to indict the other compute node 116 (FIG. 5, block 550).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

The invention claimed is:

1. A method of implementing a deterministic hardware indictment process in response to occurrence of a fatal error on a Peripheral Component Interconnect Express (PCIe) Non-Transparent Bridge (NTB) interconnecting two compute nodes of a storage engine, comprising, by each compute node:
   identifying occurrence of the fatal error on the PCIe NTB;
   generating a first Local Error Reporting Data Structure (LERDS) containing information about a state of hardware and software components on this compute node;
   transmitting the first LERDS generated on this compute node to the other compute node using a transmission medium separate from the PCIe NTB; and
   determining if a second LERDS has been received from the other compute node;
   in response to a determination that the second LERDS has not been received from the other compute node, using the first LERDS that this compute node generated to perform a self-indictment check and indicting either this compute node or the other compute node based on a result of the self-indictment check;
   in response a determination that the second LERDS has been received from the other compute node, comparing the first LERDS with the second LERDS to determine whether only one of the compute nodes has reported an error or if both compute nodes have reported an error;
   in response to a determination that only one of the compute nodes has reported an error, indicting the compute node that reported the error;
   in response to a determination that both compute nodes have reported errors, comparing the first LERDS with the second LERDS to perform an error comparison process;
   determining, from the error comparison process, whether one of the compute nodes has reported a more sever error;
   in response to a determination that one of the compute nodes has reported a more severe error, indicting the one of the compute nodes; and
   in response to a determination that both compute nodes have reported errors with equal severity, indicting a default compute node.

2. The method of claim 1, further comprising, in response to identifying occurrence of the fatal error on the PCIe NTB, shutting down the PCIe NTB by one compute node or by both compute nodes to prevent further transactions from occurring on the PCIe NTB.

3. The method of claim 1, wherein transmitting the first LERDS generated on this compute node to the other compute node, comprises generating a User Datagram Protocol (UDP) datagram and transmitting the UDP datagram containing the first LERDS to the other compute node.

4. The method of claim 1, wherein the first LERDS contains information identifying any local errors, information identifying any hardware components have been faulted, and information identifying any fatal software errors, timeouts, and system state or performance statistics.

5. The method of claim 1, wherein determining if the second LERDS has been received from the other compute node comprises:
   writing a discernable pattern to a data structure;
   waiting a predetermined period of time;
   while waiting the predetermined time, writing a payload of any message received from the other compute node on the transmission medium separate from the PCIe NTB;
   upon expiration of the predetermined period of time, reading the data structure and comparing content of the data structure with the discernable pattern;
   in response to a determination that the data structure contains the discernable pattern, determining that the second LERDS has not been received; and
   in response to a determination that at least a portion of the data structure does not contain the discernable pattern, determining that the second LERDS has been received and reading the second LERDS from the data structure.

6. The method of claim 1, wherein the self-indictment check comprises:
performing a self-indict error check, and indicting this compute node in response to a determination that this compute node contains any self-indict error messages;
performing a heartbeat check, and indicting the other compute node in response to a determination that the heartbeat check indicates a heartbeat failure;
performing a PCIe root complex check on a PCIe root complex on this compute node, and indicting this compute node in response to a determination that an error has been identified in the PCIe root complex on this compute node;
performing a PCIe link failure check, and indicting the other compute node in response to a determination that the PCIe link failure check identifies a PCIe link failure message;
performing a software check on software that is designed to move data within the storage engine, and indicting this compute node in response to a determination that the software check has identified a software error on this compute node;
performing a unique stamp self-test, and indicting this compute node in response to a determination that this compute node has failed the unique stamp self-test; and
in response to a determination that this compute node has not failed any tests, indicting the other compute node.

7. The method of claim 1, wherein, in response a determination that the second LERDS has been received from the other compute node, the method further comprising implementing a vital instance comparison check before comparing the first LERDS with the second LERDS to determine whether only one of the compute nodes has reported an error or if both compute nodes have reported an error.

8. The method of claim 7, wherein the vital instance comparison check comprises:
determining whether this compute node is a default compute node or a not default compute node, the default compute node being a pre-selected compute node to indict in instances where the deterministic hardware indictment process results in neither compute node otherwise being selected;
determining a number of active vital instances on this compute node;
determining a number of active vital instances on the other compute node;
in response to a determination that this compute node is the default compute node, and that this compute node has less than a threshold number of vital instances, indicting this compute node;
in response to a determination that this compute node is the default compute node, that this compute node has the threshold number of vital instances and that the other compute node has less than the threshold number of vital instances, indicting the other compute node;
in response to a determination that this compute node is not the default compute node, and that the other compute node has less than a threshold number of vital instances, indicting the other compute node;
in response to a determination that this compute node is not the default compute node, that the other compute node has the threshold number of vital instances and that this compute node has less than the threshold number of vital instances, indicting this compute node; and
in response to a determination that this compute node has the threshold number of vital instances and that the other compute node has the threshold number of vital instances, indicting neither compute node.

9. The method of claim 1, wherein the error comparison process comprises an ordered series of error comparison tests ranked in descending order of severity, and wherein the error comparison process is configured to indict either this compute node or the other compute node in response to a determination that either this compute node or the other compute node has failed one of the ordered series of error comparison tests.

10. The method of claim 9, wherein the ordered series of error comparison tests comprises:
a self-indictment error test;
a heartbeat test;
an intranode bus health check;
a vital emulation health check;
a total emulation health check;
a PCIe link failure check;
a software check associated with on software that is designed to move data within the storage engine; and
one or more unique stamp tests.

11. A storage engine having two compute nodes interconnected by a Peripheral Component Interconnect Express (PCIe) Non-Transparent Bridge (NTB), each compute node being configured to implement a method of deterministic hardware indictment in response to occurrence of a fatal error on the PCIe NTB, the method of deterministic hardware indictment being configured to result in both compute nodes determining the same indictment decision in response to occurrence of the fatal error on the PCIe NTB, the method of deterministic hardware indictment comprising:
identifying occurrence of the fatal error on the PCIe NTB;
generating a first Local Error Reporting Data Structure (LERDS) containing information about a state of hardware and software components on this compute node;
transmitting the first LERDS generated on this compute node to the other compute node using a transmission medium separate from the PCIe NTB; and
determining if a second LERDS has been received from the other compute node;
in response to a determination that the second LERDS has not been received from the other compute node, using the first LERDS that this compute node generated to perform a self-indictment check and indicting either this compute node or the other compute node based on a result of the self-indictment check;
in response a determination that the second LERDS has been received from the other compute node, comparing the first LERDS with the second LERDS to determine whether only one of the compute nodes has reported an error or if both compute nodes have reported an error;
in response to a determination that only one of the compute nodes has reported an error, indicting the compute node that reported the error;
in response to a determination that both compute nodes have reported errors, comparing the first LERDS with the second LERDS to perform an error comparison process;
determining, from the error comparison process, whether one of the compute nodes has reported a more sever error;
in response to a determination that one of the compute nodes has reported a more severe error, indicting the one of the compute nodes; and in response to a determination that both compute nodes have reported errors with equal severity, indicting a default compute node.

12. The storage engine of claim 11, the method of deterministic hardware indictment further comprising, in response to identifying occurrence of the fatal error on the PCIe NTB, shutting down the PCIe NTB by one compute node or by both compute nodes to prevent further transactions from occurring on the PCIe NTB.

13. The storage engine of claim 11, wherein transmitting the first LERDS generated on this compute node to the other compute node, comprises generating a User Datagram Protocol (UDP) datagram and transmitting the UDP datagram containing the first LERDS to the other compute node.

14. The storage engine of claim 11, wherein the first LERDS contains information identifying any local errors, information identifying any hardware components have been faulted, and information identifying any fatal software errors, timeouts, and system state or performance statistics.

15. The storage engine of claim 11, wherein determining if the second LERDS has been received from the other compute node comprises:
    writing a discernable pattern to a data structure;
    waiting a predetermined period of time;
    while waiting the predetermined time, writing a payload of any message received from the other compute node on the transmission medium separate from the PCIe NTB;
    upon expiration of the predetermined period of time, reading the data structure and comparing content of the data structure with the discernable pattern;
    in response to a determination that the data structure contains the discernable pattern, determining that the second LERDS has not been received; and
    in response to a determination that at least a portion of the data structure does not contain the discernable pattern, determining that the second LERDS has been received and reading the second LERDS from the data structure.

16. The storage engine of claim 11, wherein the self-indictment check comprises:
    performing a self-indict error check, and indicting this compute node in response to a determination that this compute node contains any self-indict error messages;
    performing a heartbeat check, and indicting the other compute node in response to a determination that the heartbeat check indicates a heartbeat failure;
    performing a PCIe root complex check on a PCIe root complex on this compute node, and indicting this compute node in response to a determination that an error has been identified in the PCIe root complex on this compute node;
    performing a PCIe link failure check, and indicting the other compute node in response to a determination that the PCIe link failure check identifies a PCIe link failure message;
    performing a software check on software that is designed to move data within the storage engine, and indicting this compute node in response to a determination that the software check has identified a software error on this compute node;
    performing a unique stamp self-test, and indicting this compute node in response to a determination that this compute node has failed the unique stamp self-test; and
    in response to a determination that this compute node has not failed any tests, indicting the other compute node.

17. The storage engine of claim 11, wherein, in response a determination that the second LERDS has been received from the other compute node, the method of deterministic hardware indictment further comprising implementing a vital instance comparison check before comparing the first LERDS with the second LERDS to determine whether only one of the compute nodes has reported an error or if both compute nodes have reported an error.

18. The storage engine of claim 17, wherein the vital instance comparison check comprises:
    determining whether this compute node is a default compute node or a not default compute node, the default compute node being a pre-selected compute node to indict in instances where the deterministic hardware indictment process results in neither compute node otherwise being selected;
    determining a number of active vital instances on this compute node;
    determining a number of active vital instances on the other compute node;
    in response to a determination that this compute node is the default compute node, and that this compute node has less than a threshold number of vital instances, indicting this compute node;
    in response to a determination that this compute node is the default compute node, that this compute node has the threshold number of vital instances and that the other compute node has less than the threshold number of vital instances, indicting the other compute node;
    in response to a determination that this compute node is not the default compute node, and that the other compute node has less than a threshold number of vital instances, indicting the other compute node;
    in response to a determination that this compute node is not the default compute node, that the other compute node has the threshold number of vital instances and that this compute node has less than the threshold number of vital instances, indicting this compute node; and
    in response to a determination that this compute node has the threshold number of vital instances and that the other compute node has the threshold number of vital instances, indicting neither compute node.

19. The storage engine of claim 11, wherein the error comparison process comprises an ordered series of error comparison tests ranked in descending order of severity, and wherein the error comparison process is configured to indict either this compute node or the other compute node in response to a determination that either this compute node or the other compute node has failed one of the ordered series of error comparison tests.

20. The storage engine of claim 19, wherein the ordered series of error comparison tests comprises:
    a self-indictment error test;
    a heartbeat test;
    an intranode bus health check;
    a vital emulation health check;
    a total emulation health check;
    a PCIe link failure check;
    a software check associated with on software that is designed to move data within the storage engine; and
    one or more unique stamp tests.

* * * * *